(12) United States Patent
Raghavan et al.

(10) Patent No.: US 7,248,890 B1
(45) Date of Patent: Jul. 24, 2007

(54) CHANNEL POWER BALANCING IN A MULTI-CHANNEL TRANSCEIVER SYSTEM

(75) Inventors: Sreen A. Raghavan, La Jolla, CA (US); Thulasinath G. Manickam, San Diego, CA (US); Peter J. Sallaway, San Diego, CA (US); Gerard E. Taylor, Laguna Nigel, CA (US)

(73) Assignee: Vativ Technologies, Inc., San Diego, CA (US)

( * ) Notice: Subject to any disclaimer, the term of this patent is extended or adjusted under 35 U.S.C. 154(b) by 651 days.

(21) Appl. No.: 10/773,750

(22) Filed: Feb. 6, 2004

(51) Int. Cl.
*H04B 7/00* (2006.01)
*H04Q 7/20* (2006.01)

(52) U.S. Cl. .......................... 455/522; 455/68; 455/69; 455/67.11; 455/67.13; 455/127.1; 455/127.2; 455/127.3; 455/226.1; 455/245.1; 455/245.2; 455/232.1; 455/234.2; 455/235.1; 379/318; 379/252; 398/137

(58) Field of Classification Search .. 455/245.1–245.2, 455/102–104, 132–136, 550.1, 552.1, 553.1, 455/67.1–16, 68–71, 522, 88, 78–83, 127.1–127.5, 455/115.1–115.4, 561, 232.1, 226.1–226.4, 455/233.1, 234.1–234.2, 235.1; 370/318, 370/342, 252–253, 311, 536, 542–544; 375/220–221, 375/295, 297, 298, 302; 398/135, 137, 118, 398/120, 162, 128, 136, 197
See application file for complete search history.

(56) References Cited

U.S. PATENT DOCUMENTS

| | | | | |
|---|---|---|---|---|
| 5,267,262 A | * | 11/1993 | Wheatley, III | 455/522 |
| 5,841,768 A | * | 11/1998 | Ozluturk et al. | 370/335 |
| 5,887,245 A | * | 3/1999 | Lindroth et al. | 455/69 |
| 6,070,058 A | * | 5/2000 | Waldroup et al. | 455/69 |
| 6,125,266 A | * | 9/2000 | Matero et al. | 455/126 |
| 6,370,203 B1 | * | 4/2002 | Boesch et al. | 375/297 |
| 6,714,765 B1 | * | 3/2004 | Kimppa | 455/76 |
| 6,718,165 B1 | * | 4/2004 | Ha | 455/234.2 |
| 6,819,938 B2 | * | 11/2004 | Sahota | 455/522 |
| 6,920,324 B2 | * | 7/2005 | Atarius et al. | 455/436 |
| 7,123,840 B2 | * | 10/2006 | Hamilton | 398/137 |
| 2004/0077326 A1 | * | 4/2004 | Shi | 455/313 |

* cited by examiner

*Primary Examiner*—Matthew D. Anderson
*Assistant Examiner*—Tuan Tran
(74) *Attorney, Agent, or Firm*—Finnegan, Henderson, Farabow, Garrett & Dunner, L.L.P.

(57) ABSTRACT

A transceiver according to some embodiments of the present invention receives data from a plurality of frequency separated transmission channels from a complementary transmitter of another transceiver and adjusts the power output of certain channels in a transmitter of the receiver. Upon start-up, the power output levels of signals in individual channels in the transmitter can be preset. A power balance can determine new power output levels of the transmitter from parameters in the receiver while receiving data transmitted by a similarly situated complementary transmitter in a second transceiver coupled to the transceiver. In some embodiments, a complementary receiver of the other transceiver determines the power outputs of the transmitter and the power levels are transmitted to the transmitter by the other transceiver.

5 Claims, 16 Drawing Sheets

CHANNEL POWER BALANCING IN A MULTI-CHANNEL TRANSCEIVER SYSTEM

BACKGROUND

1. Field of the Invention

The present invention is related to high-speed communications of data in a communication system and, in particular, to high data rate transmission of data between components in a communication system.

2. Discussion of Related Art

There is currently a great deal of interest in high speed transceiver systems, both for communications in an intranet environment and for communications between components in various systems. As an example of a high data rate system, high-speed Ethernet local area networks (LANs), 100 BASE-TX Ethernet and 1000 Base TX Ethernet (1 Gigabit/s) using category-5, 5E or 6 copper wire, are being developed. These high speed systems require new techniques in high-speed data processing. High-speed data transmission techniques are also useful in wide-area networks and digital subscriber loop applications. High data rate transceiver systems are also utilized in many back-plane environments, including optical switching devices, router systems, switches, and storage area networking switches. Other environments that utilize high speed communication between components include inter-cabinet communications and chip-to-chip communications.

Typically, data is transferred in a communication system by transmitting signals having voltages from sets of voltages referred to as symbol sets. Each symbol (i.e. voltage level) in the symbol set represents one or more digital bits of data. Existing techniques utilized in such environments typically use non-return to zero (NRZ) modulation to send and receive information over high-bandwidth transmission media. Other common symbol sets include MLT3, PAM or QAM systems. Typically, the transceiver for sending high-speed data over such networks is called a serializer/deserializer, or SERDES, device.

FIG. 1A shows a block diagram of a typical transceiver environment 100. Components 101-1 through 101-Q are coupled to transmit and receive data through input/output (I/O) ports 102-1 through 102-Q, respectively, which are coupled through transmission medium 110. Conventionally, components 101-1 through 101-Q are SERDES devices. Transceiver environment 100 can represent either a back-plane environment (where components 101-1 through 101-Q are physically relatively close to one another) or a networking environment (where components 101-1 through 101-Q are more separated).

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data, for example by adding redundancy in the input data, to ensure a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over transmission medium 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows an example of a conventional receiver 108 of one of SERDES devices 101-1 through 101-Q on I/O ports 102-1 through 102-Q, respectively, of FIG. 1A. Input driver 109 receives a differential voltage signal from transmission medium 110 and outputs the analog data signal to clock and data recovery circuit 115. Data recovery 115 can, in some systems, perform equalization, recover the timing, and output a serial bit stream of data to serial-to-parallel converter 111. The serial data is input to bit decoder 112, which converts the parallel data to parallel decoded data. Clock and data recovery circuit 115 also outputs the necessary clock signals to serial-to-parallel converter 111 and bit decoder 112.

The actual demands for the various data transmission environments may vary widely (e.g., LAN environments have different transmission requirements from back-plane environments). A conventional SERDES system 100 for a back-plane environment, for example, can enable serial data communication at data rates as high as 2.5 Gbps to 3.125 Gbps over a pair of FR4 copper traces in a copper back-plane communication system. Current systems utilizing category 5, 5E or 6 copper wire can enable serial data communications rates as high as 1 Gbit/sec using Gigabit Ethernet. One of the biggest problems with existing SERDES systems 100 is that they are very bandwidth inefficient, i.e., they require 3.125 GHz of bandwidth to transmit and receive 2.5 Gbps of data over a single pair of copper wires. Therefore, it is very difficult to increase the data rates across bus 110. Additionally, SERDES system 100 requires the implementation of a high clock rate (3.125 GHz for 2.5 Gbps data rates) phase locked loop (PLL) 114 implemented to transmit data and recover high clock rates in data recovery 115. The timing window within which receiver 108 needs to determine whether the received symbol in data recovery 115 is a 1 or a 0 is about 320 ps for the higher data rate systems. This timing window creates extremely stringent requirements on the design of data recovery 115 and PLL 114, as they must have very low peak-to-peak jitter.

Conventional networking environments operate at slower baud rates, but suffer from similar difficulties. As an example, a 1 Gigabit transfer can be accomplished through transmitting PAM-5 data at 125 MHz through four (4) twisted copper pair. It would be desirable to allow higher data rates in networking environments.

Conventional SERDES system 100 also suffers from other problems, including eye closure due to intersymbol interference (ISI) from the dispersion introduced by transmission medium 110. The ISI is a direct result of the fact that the copper traces of transmission medium 110 attenuate higher frequency components in the transmitted signals more than the lower frequency components in the transmitted signals. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 115. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over transmission medium 110 of communication system 100 due to the loss of signal-to-noise ratio (SNR). At higher data rates, conventional systems quickly become intractable due to the increased demands.

Therefore, there is a need for more robust systems for transmitting data in a transmission system at very high data transmission rates.

SUMMARY

In accordance with the present invention, a transceiver is presented that allows very high data transmission rates over a data bus that is less susceptible to the signal attenuation properties of the interconnect system and which balances the power transmitted into a plurality of channels on a transmission medium.

A transceiver system according to the present invention includes a coupled pair of transceivers with at least one multi-channel transmitter of a first transceiver coupled to complementary receivers on the second transceiver and at least one multi-channel receiver of the first transceiver coupled to complementary transmitters on the second transceiver, wherein the signal power output of certain channels of the multi-channel transmitter of the first transceiver are adjusted to overcome loss of signal in transmission. Each multi-channel transmitter transmits data on a plurality of frequency separated channels and each multi-channel receiver receives data on a plurality of frequency separated channels.

A transceiver in accordance with the present invention can include any number of transmitters and at least one receiver. Each of the transmitters can be in communications with a complementary receiver of a separated transceiver. Additionally, each of the at least one receivers can be in communications with a complementary transmitter of a separate transceiver. Each receiver, then, is in communications with a complementary transmitter of a different transceiver.

In some embodiments, a transmitter/receiver pair in the transceiver is in communications with a complementary transmitter/receiver pair in a second transceiver. In accordance with the present invention, power balancing can be achieved by monitoring a power sensitive parameter in the receiver of the transceiver and adjusting the power of one or more output channels in response to the power sensitive parameter in the receiver.

These and other embodiments are further discussed below with respect to the following figures.

In the figures, elements designated with the same identifications on separate figures are considered to have the same or similar functions.

DETAILED DESCRIPTION

Figure 1A:
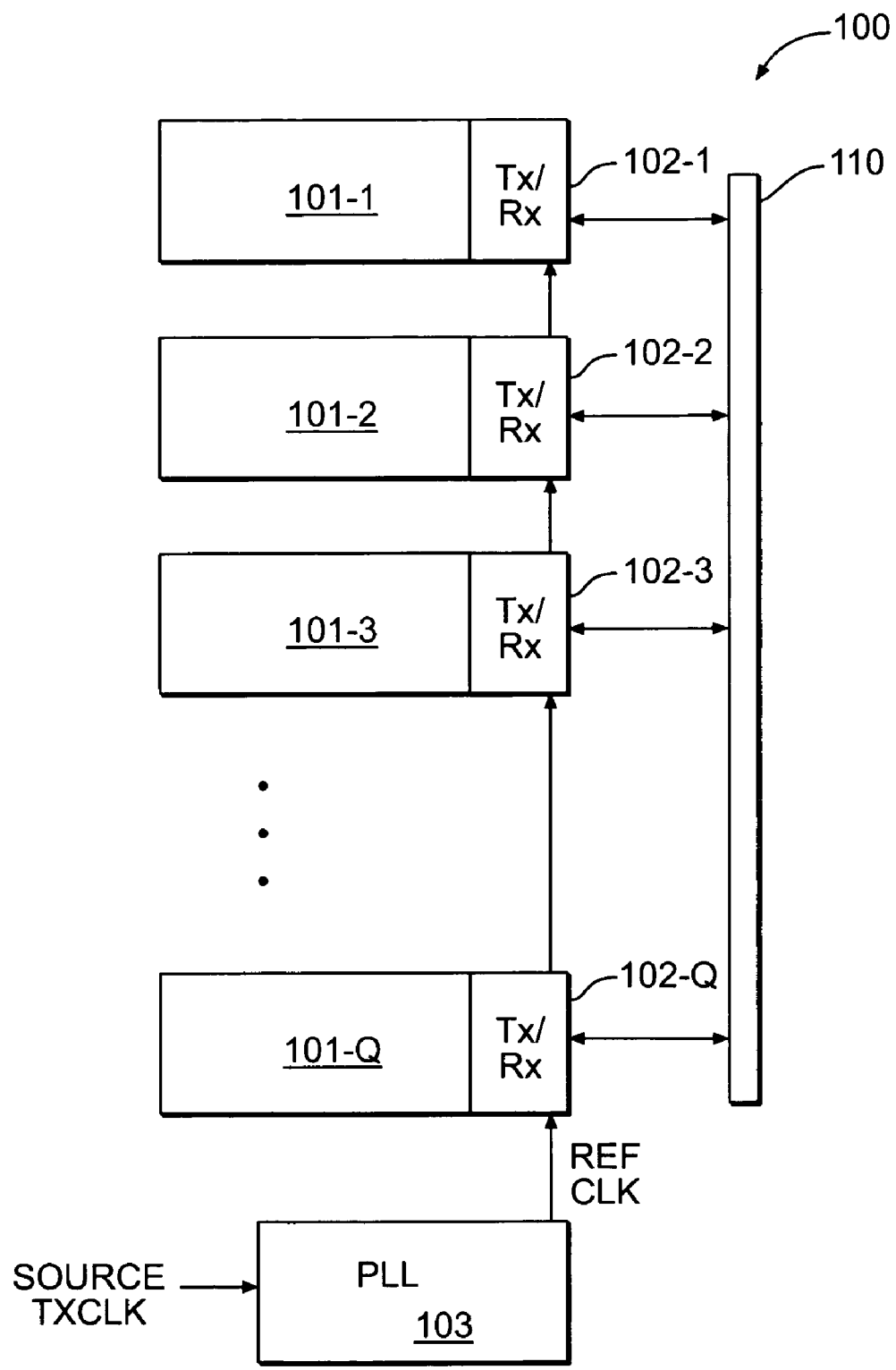
FIGS. 1A, 1B and 1C show block diagrams for a conventional system of transmitting data over a back-plane.
Figure 1B:
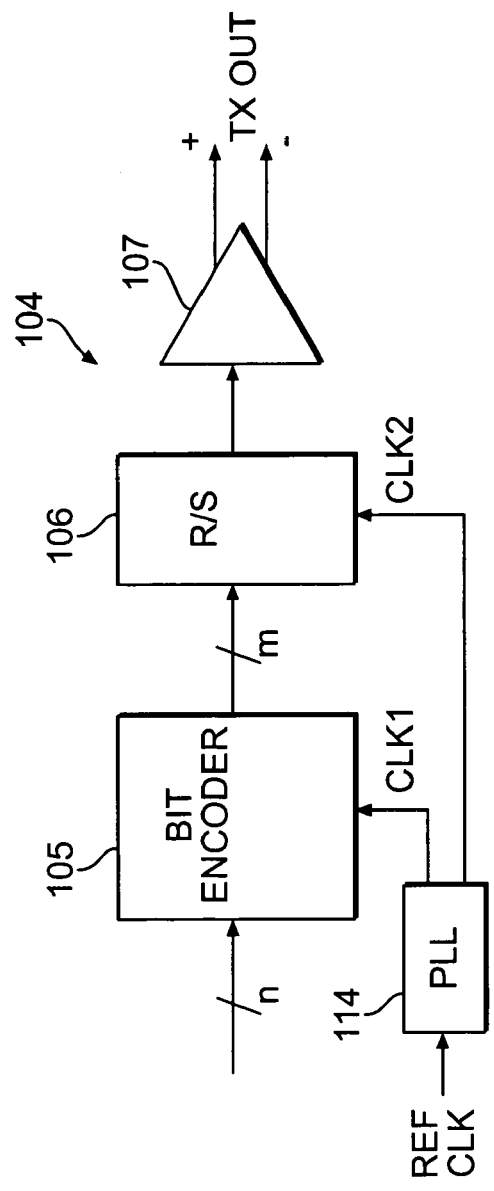
Figure 1C:
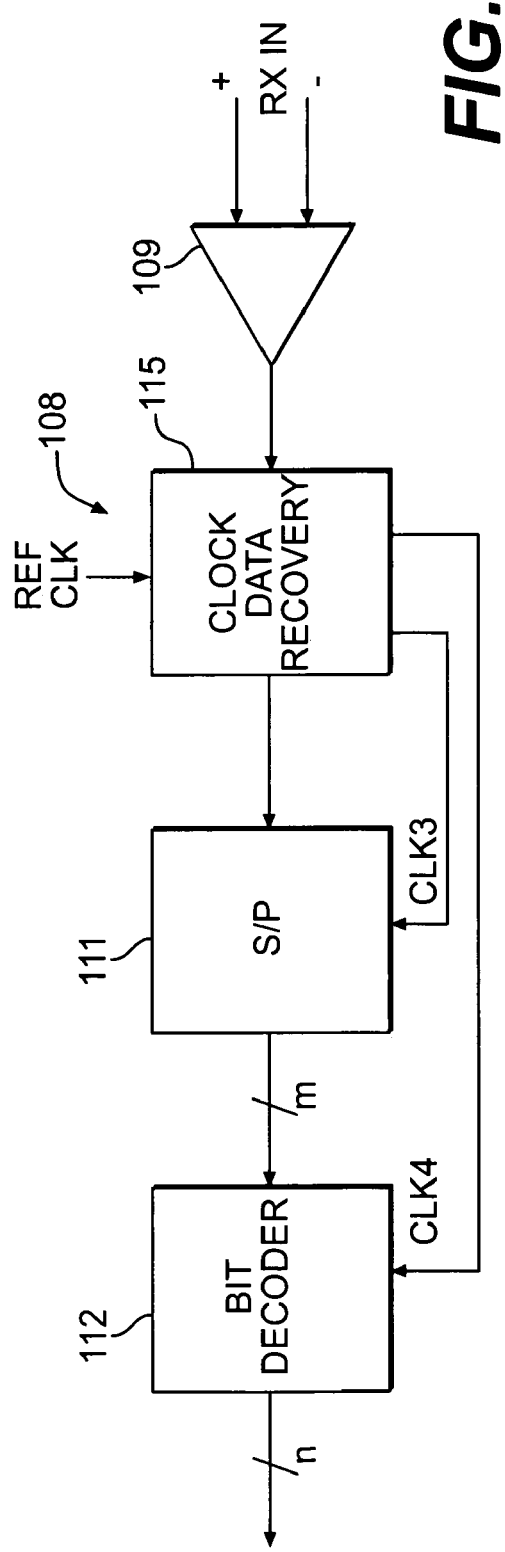
Figure 2A:
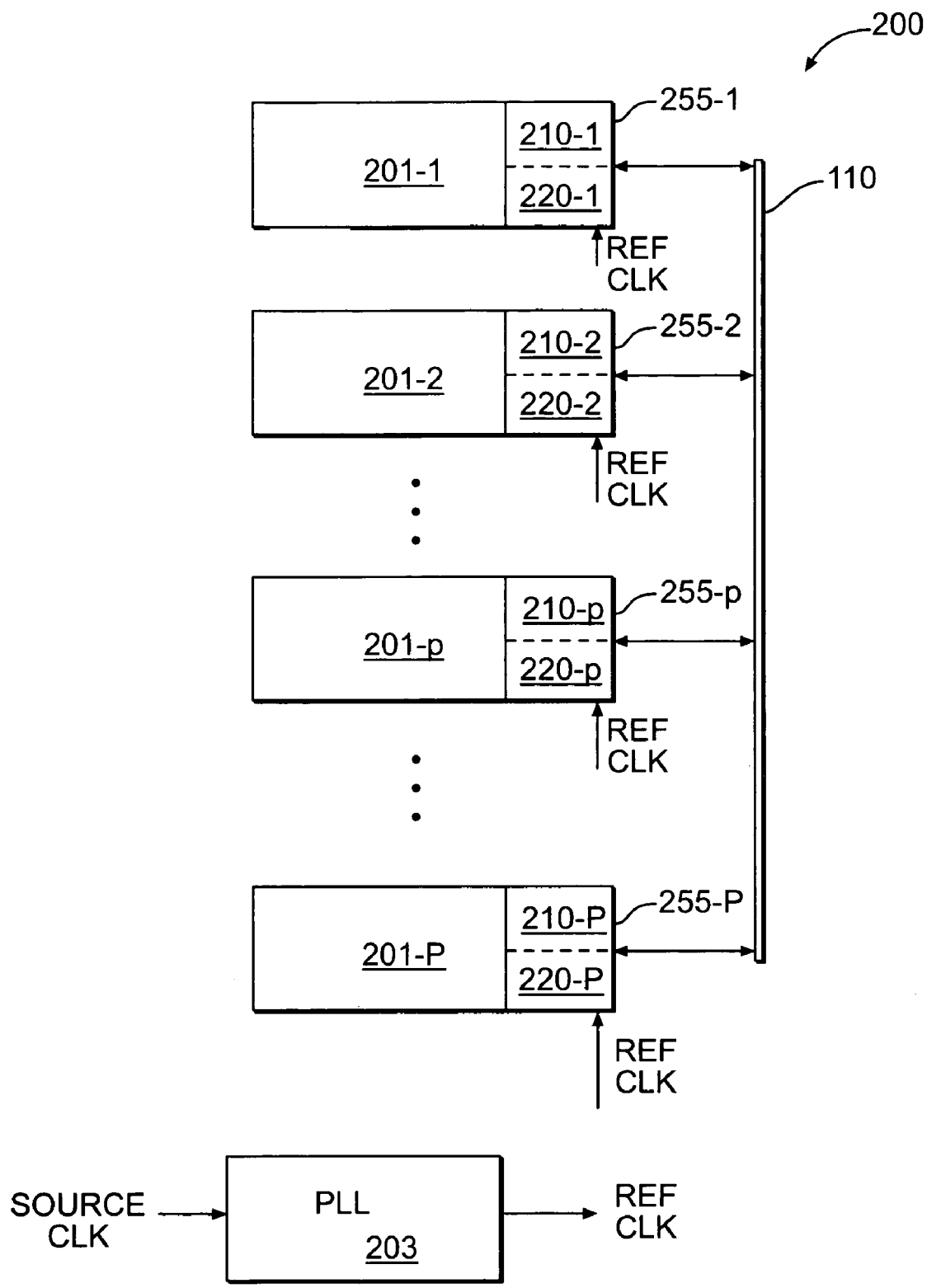
FIG. 2A shows a block diagram of a transmission system according to the present invention.

FIG. 2A shows a block diagram of a transmission system 200 according to the present invention. System 200 includes any number of components 201-1 through 201-P, with component 201-$p$ representing an arbitrary one of components 201-1 through 201-P, coupled through a transmission medium 110. Transmission medium 110 may couple component 201-$p$ to all of the components 201-1 through 201-P or may couple component 201-$p$ to selected ones of components 201-1 through 201-P. In some embodiments, individual transmitters and receivers of components 201-1 through 201-P are coupled together through category 5, 5E or 6 twisted copper pair.

Examples and details of aspects of multi-channel transceivers in addition to those presented here are described in U.S. application Ser. No. 10/454,382, "Near-End, Far-End and Echo Cancellers in a Multi-Channel Transceiver System" filed on Jun. 3, 2003 by Sreen A. Raghavan Thulasinath G. Manickam Peter J. Sallaway Gerard E. Taylor; U.S. application Ser. No. 10/310,255, "Multi-Channel Communications Transceiver", filed on Dec. 4, 2002, by Sreen A. Raghavan, Thulasinath G. Manickam, Peter J. Sallaway, and Gerard E. Tayler; U.S. application Ser. No. 10/167,158, "Multi-Channel Communications Transceiver", filed on Jun. 10, 2002, by Sreen A. Raghavan, Thulasinath G. Manickam, Peter J. Sallaway, and Gerard E. Tayler; U.S. application Ser. No. 10/071,771 to Sreen A. Raghavan, Thulasinath G. Manickam, Peter J. Sallaway, and Gerard E. Taylor; U.S. application Ser. No. 09/965,242 to Sreen Raghavan, Thulasinath G. Manickam, and Peter J. Sallaway, filed Sep. 26, 2001; and U.S. application Ser. No. 09/904,432, by Sreen Raghavan, filed on Jul. 11, 2001, each of which is assigned to the same entity as is the present application, each of which is herein incorporated by reference in its entirety.

System 200 shown in FIG. 2A can represent any transmission system, for example a local area network (LAN), wide area network (WAN), digital subscriber loop, chassis-to-chassis digital communication system, or chip-to-chip interconnect with components 201-1 through 201-P representing individual computer systems, cards, cabinets, or chips.

Transmission channel 110 can represent any transmission channel, including optical channels, infrared channels, wireless channels, multiple twisted copper pair (such as Category-5, 5E or 6 cable), copper wire, FR4 copper traces, or copper based back-plane interconnect channels. Additionally, any conducting medium can be utilized in transmission channel 110. Transmission channel 110 may further include networking devices such as routers to direct connections between individual components.

Typically, transmission channel 110 attenuates higher frequency signals more than lower frequency signals. As a result, intersymbol interference problems are typically greater for high data rate transmissions than for low data rate transmissions. In addition, cross-talk from neighboring signals increases with transmission frequency. Additionally, in order to provide an even signal power across a set of frequency-separated channels, higher transmission gains can be provided for higher signal channels to compensate for the higher signal loss.

As an example, a transmission system utilizing multiple pairs of twisted copper pair is discussed in this disclosure. It should be noted that other transmission media in other transmission environments can be used for the transmission system.

Components 201-1 through 201-P include transceivers 255-1 through 255-P, respectively. Each of transceivers 255-1 through 255-P, in turn, includes transmitter portions 210-1 through 210-P, respectively, and receiver portions 220-1 through 220-P, respectively. Each of transmitter portions 210-1 through 210-P includes one or more individual transmitters according to the present invention and each of receiver portions 220-1 through 220-P includes one or more individual receivers according to the present invention.

Figure 2B:
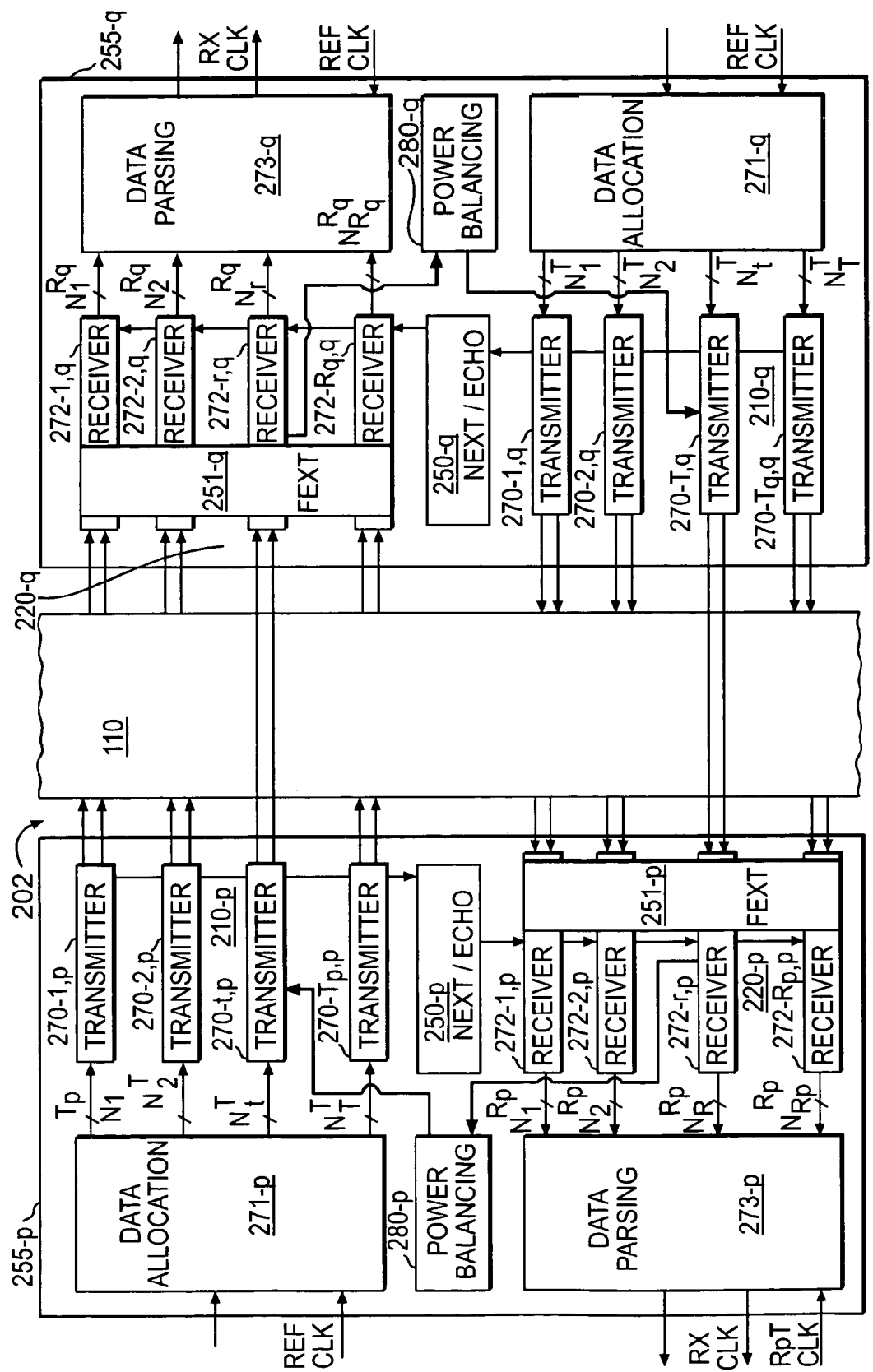
FIG. 2B shows a block diagram of a transceiver system according to the present invention.

FIG. 2B shows an embodiment of a transceiver system 202 according to some embodiments of the present invention. Transceiver system 202 of transmission system 200 couples component 201-$p$ with component 201-$q$ via transceivers 255-$p$ and 255-$q$, respectively. The embodiments of transceivers 255-$p$ and 255-$q$ shown in FIG. 2B include filters for reducing the interference in signals received by receiver portion 220-$p$. Some of the interference in the received signal can originate from neighboring transmitters to the transmitter directly communicating with receiver portion 220-$p$. In FIG. 2B, NEXT and Echo filters 250-$p$ and 250-$q$ as well as FEXT filters 251-$p$ and 251-$q$ are shown. In some embodiments of the invention, NEXT/Echo filters 250-$p$ and 250-$q$ or FEXT filters 251-$p$ and 251-$q$ may be omitted. The operation of NEXT/Echo filters 250-$p$ and 250-$q$ and FEXT filters 251-$p$ and 251-$q$ are further described in U.S. application Ser. No. 10/454,382, entitled "Near-End, Far-End and Echo Cancellers in a Multi-Channel Transceiver System", filed on Jun. 3, 2003, assigned to the same assignee as is the present disclosure, herein incorporated by reference in its entirety.

FIG. 2B illustrates transceiver 255-$p$ in communication through transmission medium 110 with transceiver 255-$q$. In the embodiments shown in FIG. 2B, transceiver 255-$p$ includes transmitter portion 210-$p$ with transmitters 270-1,$p$ through 270-$T_p$,p coupled to receive $N_1^{T_p}$ through $N_{T_p}^{T_p}$ data bits, respectively, from data allocation 271-$p$ and transmit symbols corresponding to the received data bits onto transmission medium 110. Transceiver 255-$p$ further includes receiver portion 220-$p$ with receivers 272-1,$p$ through 272-$R_p$,p. Receivers 272-1,$p$ through 272-$R_p$,p receive data from transmission medium 110 and provides $N_1^{R_p}$ through $N_{R_p}^{R_p}$ data bits, respectively, to data parsing 273-$p$. As discussed above, transceiver 255-$p$ may, in some embodiments, further include NEXT/Echo filter 250-$p$ and FEXT filter 251-$p$.

Similarly, the embodiment of transceiver 255-$q$ shown in FIG. 2B includes transmitter portion 210-$q$ with transmitters 270-1,$q$ through 270-$T_q$,q coupled to receive $N_1^{T_q}$ through $NT_p^{T_p}$ data bits, respectively, from data allocation 271-$q$ and transmit symbols corresponding to the bits onto transmission medium 110. Additionally, receiver portion 220-$q$ of transceiver 255-$p$ includes receivers 272-1,$q$ through 272-$R_q$,q to receive data from transmission medium 110 and provide corresponding $N_1^{R_q}$ through $N_{R_p}^{R_q}$ data bits, respectively, to data parsing 273-$q$. Additionally, transceiver 255-$q$ may also include a NEXT/Echo filter 250-$q$ and FEXT filter 251-$q$.

As illustrated in FIG. 2B, transmitter 270-$t,p$ of transceiver 255-$p$ is in communication with receiver 272-$r,q$ of transceiver 255-$q$ and transmitter 270-$t,q$ of transceiver 255-$q$ is in communication with receiver 272-$r,p$ of transceiver 255-$p$. Other transmitter/receiver pairs of transceiver 255-$p$ may be in communication with complementary transmitter/receiver pairs of transceiver 255-$q$ as well. In some embodiments of the invention, each of transmitters 270-1,$p$ through 270-$T_p$,p is coupled through transmission medium 110 to a complementary one of receivers 272-1,$q$ through 272-$R_q$,q of transceiver 255-$q$. Additionally, each of transmitters 270-1,$q$ through 270-$T_q$,q may be coupled through transmission medium 10 to a complementary one of receivers 272-1,$p$ through 272-$R_p$,p of transceiver 255-$p$. In general, the remaining transmitters and receivers of transceiver 255-$p$ and transceiver 255-$q$ can be in communication with complementary transmitters and receivers of any of the transceivers 255-1 through 255-P of transmission system 200.

In some embodiments of the invention, transmission medium 110 can be copper pair coupling transmitter 270-$t,p$ with receiver 272-$r,q$ and copper pair coupling transmitter 270-$t,q$ with receiver 272-$r,p$. In some embodiments, a single copper pair can be utilized to coupled transmitter 270-$t,p$ and receiver 272-$r,p$ with receiver 272-$r,q$ and transmitter 270-$t,q$. This shared-wire configuration results in echo interference between transmitter 270-$t,p$ and receiver 272-$r,p$. Echo interference at receiver 272-$r,p$ refers to the receipt of the transmitted signal from transmitter 270-$t,p$ at receiver 272-$r,p$ in the shared-wire configuration from two sources: The transmitted signal from transmitter 270-$t,p$ appears directly on receiver 272-$r,p$; and the reflection of the transmitted signal from transmitter 270-$t,p$ by the complementary receiver 272-$r,q$ and by any other connections and impedance mismatches in transmission medium 110 that would reflect the transmitted signal back to be detected by receiver 272-$r,p$.

In addition to echo interference at receiver 272-$r,p$, each of transmitters 270-1,$p$ through 270-$T_p$,p may be closely enough spaced to receiver 272-$r,p$ such that signals transmitted by each of transmitters 270-1,$p$ through 270-$T_p$,p is received by receiver 272-$r,p$. Signals transmitted by 270-1,$p$ through 270-$T_p$,p can also be received by receiver 272-$r,p$ through the proximity of wires in transmission medium 110, for example because of signals from one copper pair leaking to another copper pair. Interference by receipt of signals from transmitters 270-1,$p$ through 270-$T_p$,p at receiver 272-$r,p$, or NEXT interference, therefore, may also be present.

Therefore, to correct for Next and echo interference, some embodiments of transceiver 255-$p$ can include a NEXT/Echo filter 250-$p$. NEXT/Echo filter 250-$p$ receives input data from each of transmitters 270-1,$p$ through 270-$T_p$,p and outputs correction data to each of receivers 272-1,$p$ through 272-$R_p$,p. In some embodiments, portions of NEXT/Echo filter 250-$p$ may be distributed throughout each of receivers 272-1,$p$ through 272-$R_p$,p. Next/Echo filter 250-$p$ corrects each of receivers 272-1,$p$ through 272-$R_p$,p for echo interference and NEXT interference caused by transmitters 270-1,$p$ through 270-$T_p$,p, especially if transmitter/receiver pairs share transmission media.

Receivers 272-1,p through 272-$R_p$,p may also include a FEXT filter 251-p. FEXT filter 251-p receives inputs from each of receivers 272-1,p through 272-$R_p$,p and outputs correction data to each of receivers 272-1,p through 272-$R_p$,p. FEXT filter 251, therefore, corrects for cross interference between transmitters corresponding to each of receivers 272-1,p through 272-$R_p$,p (i.e., each of the transmitters that are transmitting data to receivers 272-1,p through 272-$R_p$,p).

As shown in FIG. 2B, each transceiver 255-p also includes a power balancing block 280-p. Power balancing block 280-p receives signals from receiver 272-r,p and provides gain values for each of the frequency separated channels transmitted by transmitter 270-t,p. In some embodiments of the invention, gain values are received by receiver 272-r,p from transmitter 270-t,q. In some embodiments, gain values for each of the frequency separated channels is calculated in power balancing 280-p based on the average power of signals received from transmitter 270-t,q. In some embodiments, gain values for transmitter 270-t,p are periodically calculated during operation of transceiver system 202. In some embodiments, gain values are set during a start-up routine, possibly through training of transceiver 255-p, and are not changed during operation of transceivers 255-p. As shown in FIG. 2B, transceiver 255-q may include power balancing 280-q, which sets gain values in transmitter 270-t,q based on signals received from receiver 272-r,q. Further discussion of power balancing 280 (e.g., 280-p or 280-q) is provided below.

In embodiments where receiver 272-r,p calculates gain values for transmitter 270-t,p, the conditions of transmission between transmitter 270-t,p and receiver 272-r,p are the same (e.g., through a shared twisted copper pair) or substantially similar. Therefore, the gain values set for transmitter 270-t,p and those utilized in transmitter 270-t,q, which in these embodiments are substantially identical transmitters, are the same. Therefore, while receiver 272-r,p is adjusting the gain of transmitter 270-t,p through power balancing 280-p, receiver 272-r,q is adjusting the gains of transmitter 270-t,q through power balancing 280-q in substantially the same way.

In embodiments where transmitter 270-t,p and transmitter 270-t,q are not substantially the same or transmission medium 110 for transmission between transmitter 270-t,p and receiver 272-r,q is different than transmission medium 110 for transmission between transmitter 270-t,q and receiver 272-r,p, then receiver 272-r,q can adjust the gains of transmitter 270-t,p by signaling receiver 272-r,p through transmitter 270-t,q. Conversely, receiver 272-r,p can adjust the gains of transmitter 270-t,q by signaling receiver 272-r,q through transmitter 270-t,p. In some embodiments, setting the gains in this fashion can be accomplished during an initial start-up routine and the gains are not adjusted during the following operation of transceiver system 202.

In some embodiments, PLL 203 (FIG. 2A) provides a reference clock signal and each of components 201-1 through 201-P can include any number of phase locked loops to provide internal timing signals. In some embodiments, each of components 201-1 through 201-P will have its own reference clock, which is compensated with a frequency adjustment circuit. As discussed in U.S. patent application Ser. No. 10/410,255, filed on Dec. 4, 2002, and U.S. patent application Ser. No. 10/167,158, filed on Jun. 10, 2002, each of which is herein incorporated by reference in their entirety, the timing between components 201-1 through 201-P is matched such that the base-band frequencies are the same for each of components 201-1 through 201-P and the up-conversion and down-conversion mixers between complementary transmitter/receiver pairs operate at the same frequency. The complexity of systems where each of components 201-1 through 201-P operate at different frequencies may be highly increased.

In some systems, for example back-plane systems or cabinet interconnects, the transmission distance through transmission channel 110, i.e., the physical separation between components 201-1 through 201-P, can be as low as 1 to 1.5 meters. In some chip-to-chip environments, the physical separation between components 201-1 though 201-P can be much less (for example a few millimeters or a few centimeters). In local area network or wide area network applications, separations between components 201-1 through 201-P can be up to 100 m for LAN and several kilometers for WAN applications. Furthermore, in some embodiments transmission channel 110 can be multiple twisted copper pair (or any other current carrying wire configuration) carrying differential signals between components 201-1 through 201-P, for example category 5, 5E or 6 cabling. In some embodiments, components 201-1 through 201-P can share wires so that fewer wires can be utilized. In some embodiments, however, dedicated conducting paths can be coupled between at least some of components 201-1 through 201-P. Further, transmission medium 110 can be an optical medium, wireless medium, or data bus medium.

Figure 2C:
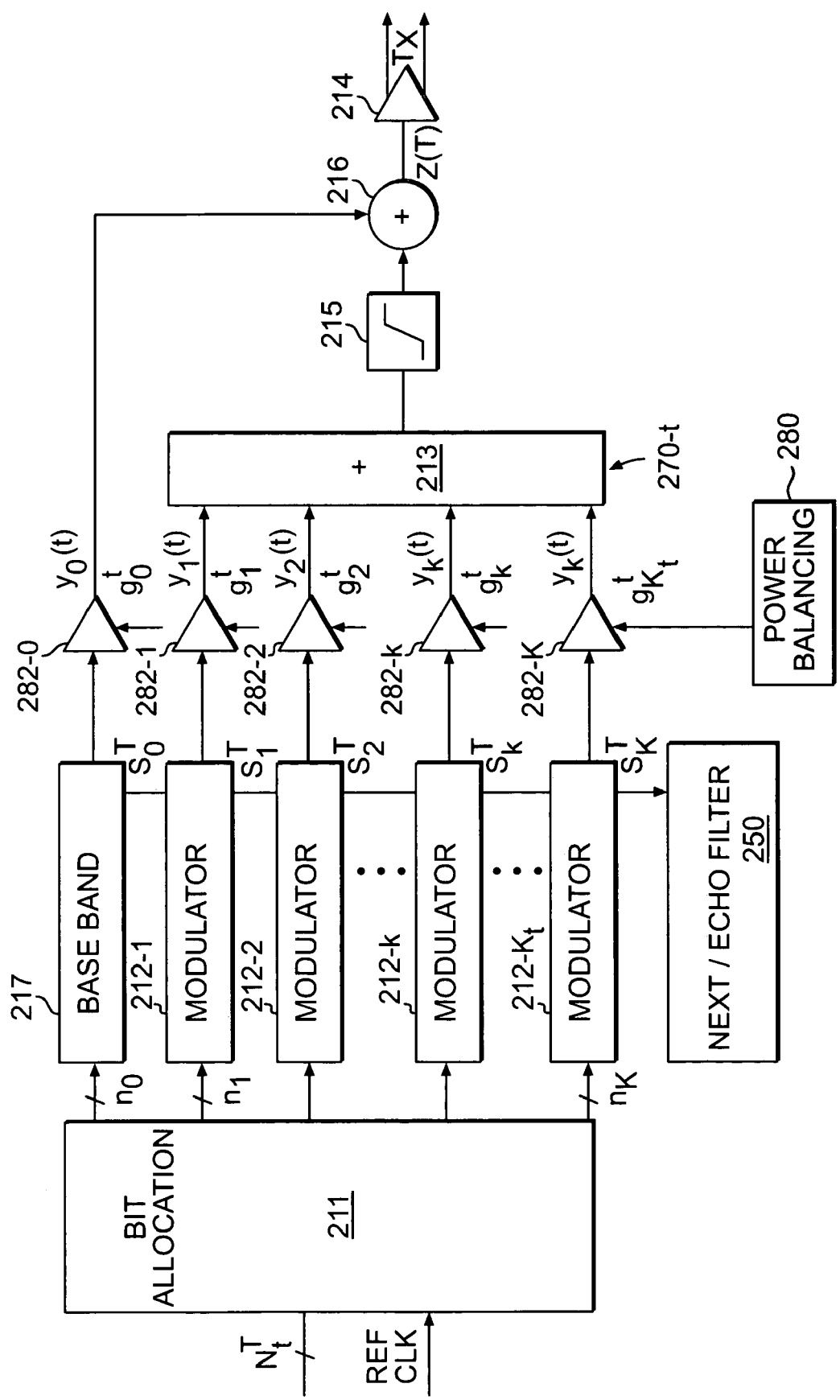
FIG. 2C shows a block diagram of a transmitter of the transceiver shown in FIG. 2B according to the present invention.

FIG. 2C shows a block diagram of an embodiment of transmitter 270-t in one of transceiver 255-p or transceiver 255-q, according to the present invention. The index indicating which of transceiver 255-p or transceiver 255-q is currently being referred to can be omitted in most discussions and will be included only if it is needed for clarity. Throughout this discussion, the subscripts on designations of individual elements indicating particular transceiver and transmitter or receiver may be neglected. Such designation will be added if clarification is needed. The particular transmitter or receiver and transceiver is clear in context and discussions with regard to a particular transmitter or receiver component can be extended to other transmitters and receivers without loss of generality.

As shown in FIG. 2C, transmitter 270-t receives an $N_t^T$-bit parallel data signal at a bit allocation block 211 to be transmitted over media 110. Bit allocation block 211 also receives the reference clock signal from PLL 203. Bit allocation block 211 segregates the $N_t^T$ input bits into groups of bits allocated to the multiple channels. In the embodiment shown in FIG. 2C, allocation block 211 segregates the $N_t^T$ input bits into K+1 individual channels such that there are $n_1$ through $n_K$ bits input to up-converting modulators 212-1 through 212-K, respectively, and $n_0$ bits input to base-band modulator 217. Some embodiments do not include base-band modulator 217. Base-band modulator 217 and up-converting modulators 212-1 through 212-K, collectively, transmit into (K+1) channels. In some embodiments, each of the $N_t^T$ bits is assigned to one of the K+1 individual channels so that the sum of $n_0$ through $n_K$ is the total number of bits $N_t^T$. In some embodiments, bit allocation block 211 may include error coding, redundancy, or other overall encoding such that the number of bits output by bit allocation block 211, i.e.

$$\sum_{i=0}^{K} n_i,$$

is greater than $N_t^T$.

Each of up-converting modulators 212-1 through 212-K encodes the digital data input to it and outputs a signal modulated at a different carrier frequency. Therefore, the $n_k$ digital data bits input to up-converting modulator 212-k, an arbitrary one of up-converting modulators 212-1 through 212-K of transmitter 270-t, is output as an analog signal in a kth transmission channel at a carrier frequency $f_k$. Additionally, base-band modulator 217, if present, transmits into the base-band channel. Further discussion of embodiments of transmitter 270-t is included in U.S. application Ser. No. 09/904,432, filed on Jul. 11, 2001, U.S. application Ser. No. 09/965,242, filed on Sep. 26, 2001, application Ser. No. 10/071,771, filed on Feb. 6, 2002, and application Ser. No. 10/310,255, filed on Dec. 4, 2002, each of which has been incorporated herein by reference in its entirety.

Figure 3:
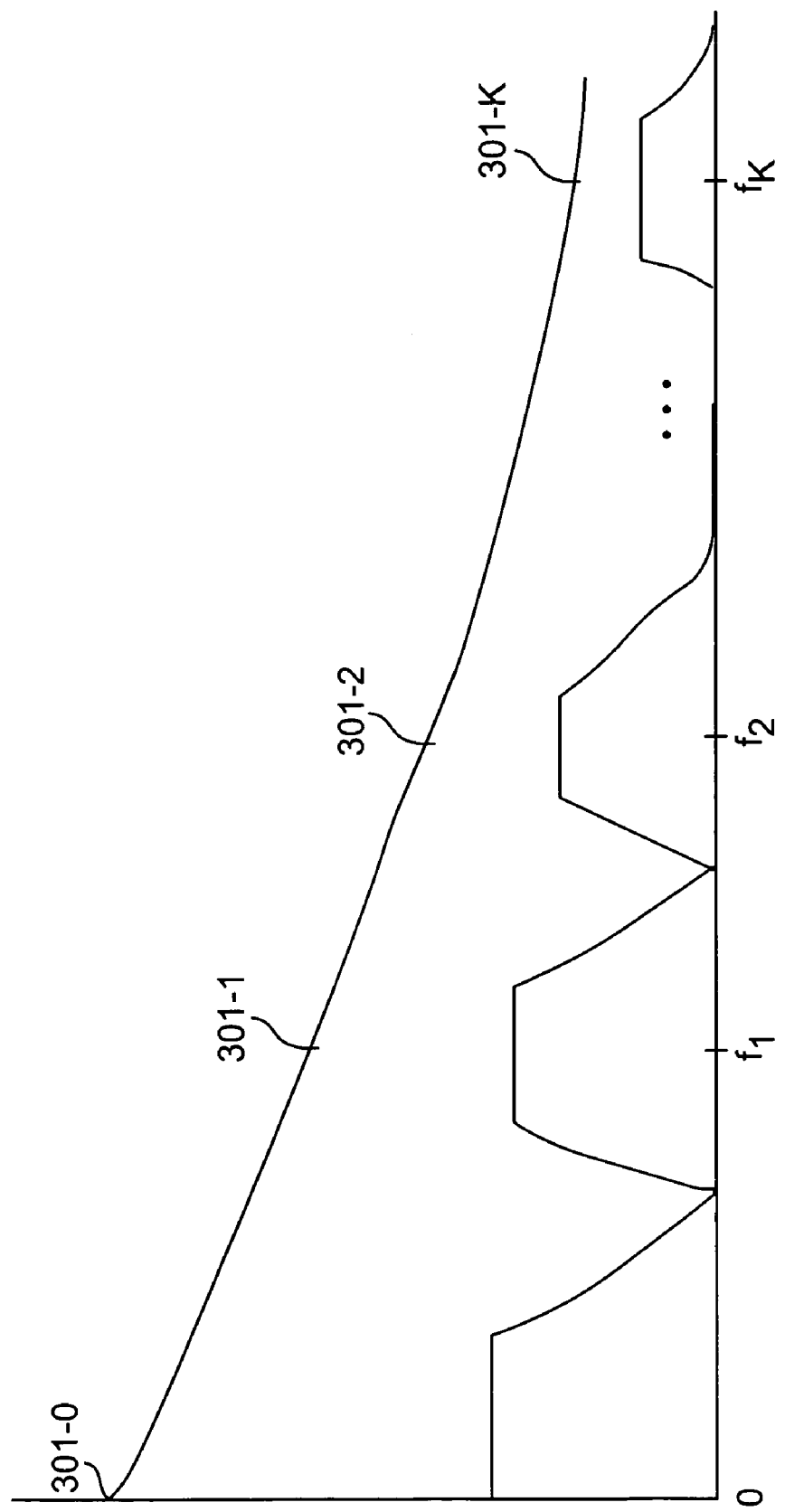
FIG. 3 shows a graph of attenuation versus transmission band on the transmission medium according to the present invention.

FIG. 3 shows schematically the transport function for a typical transmission channel, H(f), of transmission medium 110. As is shown, the attenuation at higher frequencies is greater than the attenuation at lower frequencies. Up-converting modulators 212-1 through 212-K transmit analog data at carrier frequencies centered about frequencies $f_1$ through $f_K$, respectively. Therefore, modulators 212-1 through 212-K transmit into transmission channels 301-1 through 301-K, respectively. Base-band modulator 217 transmits into transmission channel 301-0, which is centered at 0 frequency. In some embodiments, the width of each of transmission channels 301-0 through 301-K can be the same. The width of the bands of each of transmission channels 301-0 through 301-K can be narrow enough so that there is little to no overlap between adjacent ones of transmission channels 301-0 through 301-K. In some embodiments, because the attenuation for the lower frequency channels is much smaller than the attenuation for the higher frequency channels, lower frequency channels can be bit-loaded to carry a higher number of bits per baud interval than the number of bits per baud interval that can be carried at higher carrier frequencies.

As shown in FIG. 2C, the analog output signal from each of up-converting modulators 212-1 through 212-K, is input to a corresponding one of amplifiers 282-1 through 282-K$_t$. The output signal from base-band modulator 217 is input to amplifier 282-0. The gains of amplifiers 282-0 through 282-K, $g_0^t$ through $g_{K_t}^t$, respectively, are input to transmitter 270-t. As shown in FIG. 2B, the gain parameters to transmitter 270-t,p are input from power balancing 280-p and the gain parameters for transmitter 270-t,q are input from power balancing 280-q. Transmitter 270-t,p, then, receives gain values $g_0^{t,p}$ through $g_{K_t}^{t,p}$ from power balancing 280-p.

The output values from amplifiers 282-0 through 282-K$_t$, $y_1(t)$ through $y_{Kt}(t)$, then represents the transmission signal in each of channels 301-1 through 301-K$_t$, respectively. Signals $y_1(t)$ through $y_{Kt}(t)$ are input to summer 213 and the summed analog signal output from summer 213 can be input to a high pass filter 215. The output signal from high pass filter 215 is input to summer 216 where it is summed with the base-band signal $y_0(t)$ from base-band modulator 217. High pass filter 215 prevents up-converting modulators 212-1 through 212-K from transmitting signals into the base-band channel and reduces or eliminates the need to consider cross-channel interference between signals produced by base-band modulator 217 and those generated by up-converting modulators 212-1 through 212-K.

The output signal from summer 216, z(t), is input to an output driver 214. In some embodiments, output driver 214 generates a differential transmit signal corresponding to signal z(t) for transmission over transmission medium 110. Output driver 214, if transmission medium 110 is an optical medium, can also be an optical driver modulating the intensity of an optical signal in response to the signal z(t). The signal z(t), after transmission through transmission medium 110, is received by a complementary receiver in one of components 201-1 through 201-P.

Figure 2D:
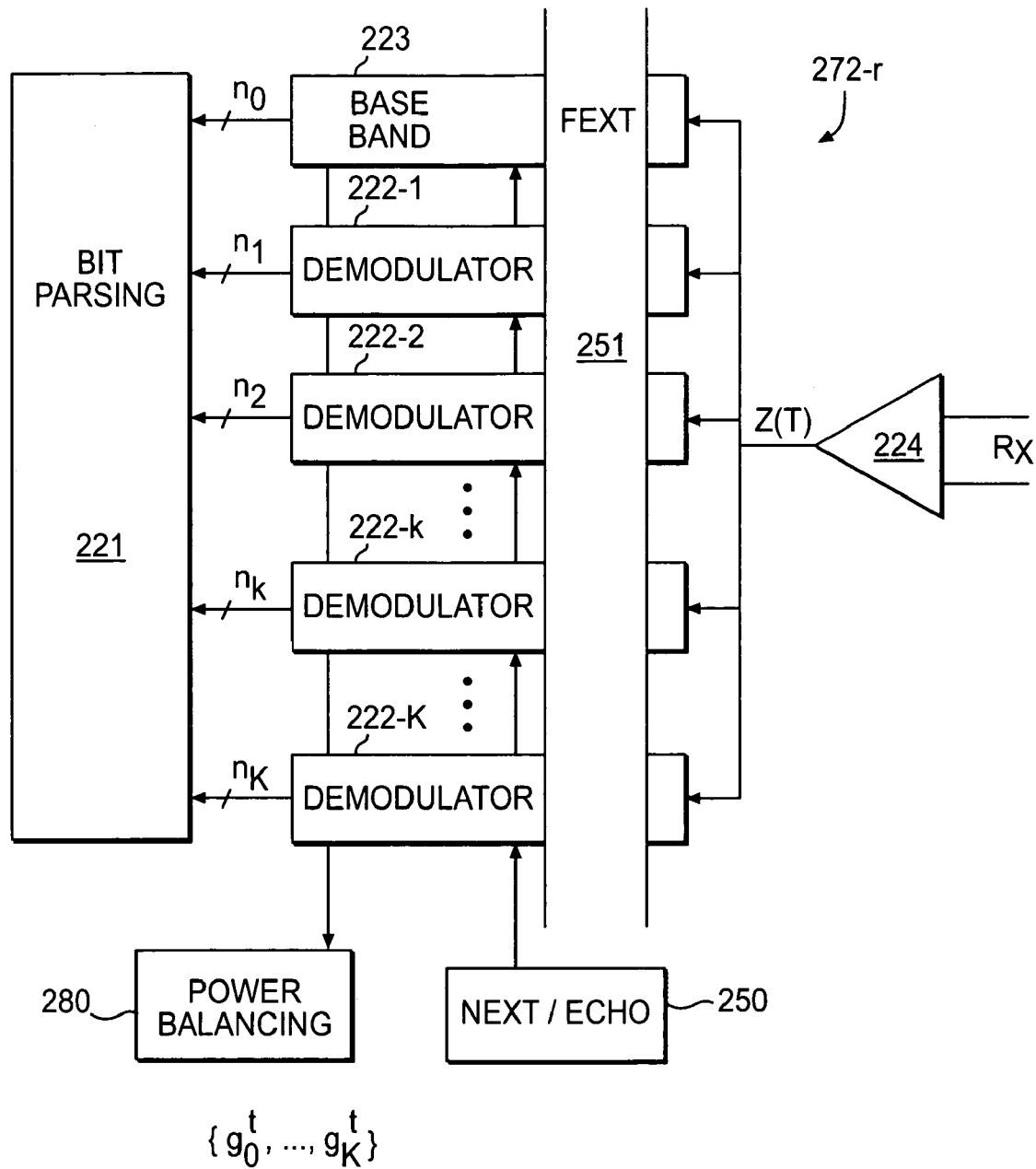
FIG. 2D shows a block diagram of a receiver of the transceiver shown in FIG. 2B according to the present invention.

FIG. 2D shows an example of a receiver 272-r. Again, for ease of discussion, indices to particular transceiver have been omitted in this discussion. Receiver 272-r can receive a differential receive signal, which originated from a complementary transmitter, into an input buffer 224. Receiver 272-r, for example, may be receiver 272-r,p of transceiver 255-p shown in FIG. 2B, which receives data from transmitter 270-p,q of transceiver 255-q.

In some embodiments, an optical signal can be received at input buffer 224, in which case input buffer 224 includes an optical detector. The output signal from input buffer 224, Z(t), is closely related to the output signal from the complementary transmitter, but shows the effects of transmission through transmission medium 110, including intersymbol interference (ISI) and signal attenuation. Additionally, near-end crosstalk interference and possibly Echo interference from the signals transmitted by transmitter 210-p of transceiver 255-p will also be included in signal Z(t). Also, the signal Z(t) may include FEXT interference resulting from signals transmitted by transmitters adjacent to the complementary transmitter.

The signal Z(t) is input to each of down-converting demodulators 222-1 through 222-K and into base-band demodulator 223. Down-converting demodulators 222-1 through 222-K demodulate the signals from each of the transmission channels 301-1 through 301-K, respectively, and recovers the bit stream from each of carrier frequencies $f_1$ through $f_K$, respectively. Base-band demodulator 223 recovers the bit stream which has been transmitted into the base-band channel, if the base-band channel is present. The output signals from each of down-converting demodulators 222-1 through 222-K, then, include $n_1$ through $n_K$ parallel bits, respectively, and the output signal from base-band demodulator 223 include $n_0$ parallel bits. In the embodiment shown in FIG. 2D, each of base-band demodulator 223 and down-converting demodulators 222-1 through 222-K can be coupled to Next/Echo filter 250, can be coupled to FEXT filter 251, and can be coupled to receive signals from each of the others of base-band demodulator 223 and down-converting demodulators 222-1 through 222-K. Therefore, in some embodiments each of base-band demodulator 223 and down-converting demodulators 222-1 through 222-K can correct for NEXT and Echo interference, FEXT interference, and cross-channel coupling interference. As discussed above, embodiments of receiver 272-r according to the present invention can include one or more of Next/Echo filter 250 and FEXT filter 251.

As shown in FIG. 2D, power balancing 280 can receive signals from each of base-band demodulator 223 and down-converting demodulators 222-1 through 222-K that are indicative of the signal power for the base-band channel and each of the received frequency-separated channels. From these signals, power balancing 280 determines the gains $g_0^t$ through $g_K^t$ of the complimentary transmitter 270-t. In some embodiments of the invention, power balancing 280 may be distributed throughout base-band demodulator 223 and down-converting demodulators 222-1 through 222-K, where each of base-band demodulator 223 and down-converting demodulators 222-1 through 222-K calculate the gain for a corresponding base-band modulator 217 and up-converting modulators 212-1 through 212-K$_t$ of transmitter 270-t directly. In those embodiments, the center frequencies of each of the frequency separated channels transmitted by transmitter 270-$t$ is the same as the center frequencies of each of the frequency separated channels received by receiver 272-$r$.

In the embodiments disclosed here, transmitter 270-$t,p$ and receiver 272-$r,p$ utilize the same set of frequency separated channels. In general, other transmitter/receiver pairs in transceiver 255-$p$ may utilize a different set of frequency separated channels (i.e., the center frequencies and the number of channels may vary). In embodiments where gain values for transmitter 270-$t,p$ are transmitted to receiver 272-$r,p$ from transceiver 255-$q$, transmitter 270-$t,p$ and receiver 272-$r,p$ may also utilize different sets of frequency separated channels. A complementary transceiver/receiver pair (e.g., transmitter 270-$t,p$ and the receiver 272-$r,q$) utilizes a common set of transmission channels. In the embodiments specifically described below, the transmission frequencies $f_1$ through $f_K$ for each of transceivers 255-1 through 255-P are integral multiples of a frequency $f_0$.

As shown in FIG. 2D, the output signals from base-band demodulator 223 and down-converting demodulators 222-1 through 222-K are input to bit parsing 221 where the transmitted signal having $N_r^R$ parallel bits is reconstructed. Receiver 272-$r$ also receives the reference clock signal from PLL 203, which can be used to generate internal timing signals. Furthermore, receiver system 220-$p$ outputs a receive clock signal with the N-bit output signal from bit parsing 221. In some embodiments, each of transceivers 255-1 through 255-P includes timing recovery in order to match the data transmission timing between complementary transmitter/receiver pairs. In embodiments where each of transmitters 270-1 through 270-T is in communication with complementary receivers of another transceiver, and receivers 272-1 through 272-R are in communication with complementary transmitters of the same other transceiver, timing can be matched between transceiver pairs.

Down-converting demodulators 222-1 through 222-K$_r$, and in some embodiments base-band demodulator 223, can be further coupled so that cross-channel interference can be cancelled. In embodiments where filter 215 of transmitter 210-$p$ is not present or does not completely remove the base-band from the output signal of adder 213, then cross-channel interference in the base-band channel also may need to be considered. Due to the mixers in the up-conversion process, multiple harmonics of each signal may be generated from each modulator in the complementary transmitter. For example, using an embodiment of transmitter 270-$t$ as an example, up-converting modulators 212-1 through 212-K can transmit at carrier frequencies $f_1$ through $f_K$ equal to $f_0$, $2f_0$ ... $Kf_0$, respectively. Base-band modulator 217 transmits at the base-band frequency, e.g. base-band modulator 217 transmits with no carrier. As shown in FIG. 2D, NEXT and Echo interference can be filtered in NEXT/Echo filter 250 and FEXT interference can be filtered in FEXT filter 251.

Figure 4A:
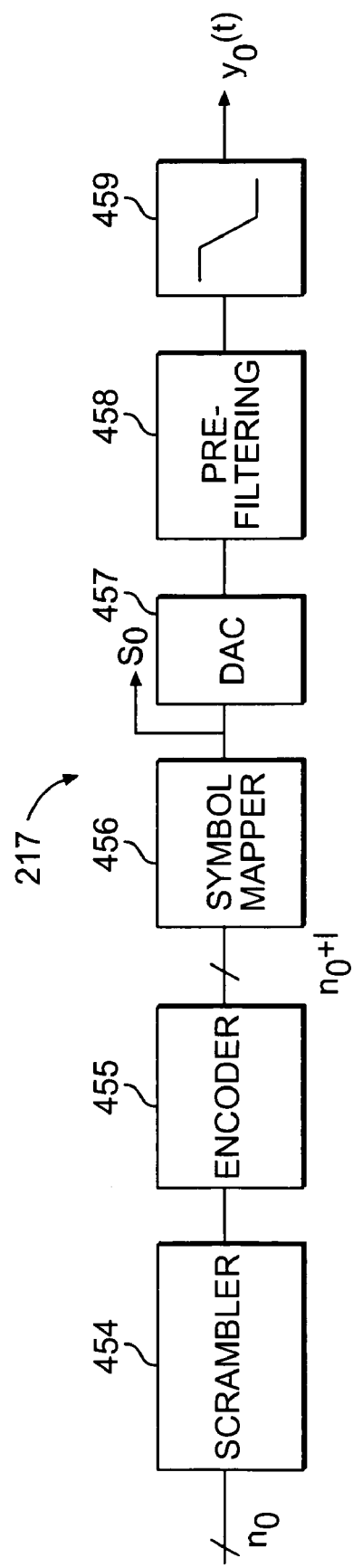
FIGS. 4A and 4B show block diagrams of embodiments of transmission modulators according to the present invention.

FIG. 4A shows an embodiment of base-band modulator 217 of transmitter 270-$t$ (FIG. 2C). Base-band modulator 217 may include a scrambler 454 and encoder 455. Scrambler 454 functions to whiten the data. Encoder 455 encodes the $n_0$ bits input to base-band modulator 217 to $n_0$+l bits. The output signal from encoder 455 is then input to symbol mapper 456. Symbol mapper 456 converts the $n_0$+l parallel bits into a symbol for transmission. In some embodiments, symbol mapper 456 can be a PAM encoder. The PAM symbol set can be of any size. In some embodiments, for example, a 16 level symbol set (16-PAM) can be utilized to represent $n_0$+l=4 parallel bits. Encoder 455 can provide 3/4 encoding or no encoding. The output signal from symbol mapper 456 is input to digital-to-analog converter 457 which converts the symbol set determined by symbol mapper 456 into the corresponding output voltages.

In some embodiments, the analog output signal from DAC 457 is prefiltered through filter 458. In some embodiments, filter 458 may prepare the output signal for transmission through medium 110 (see FIG. 2A) so that the signal received by a receiver is corrected for distortions caused by the channel. For example, if the base-band channel of transmission medium 110 is known to have a transfer function of (1+D(z)), then filter 458 may execute a transfer function equal to 1/(1+D(z)) in order to cancel the transfer function of transmission medium 110. The output signal from filter 458 can be input to low-pass filter 459. Filter 459 removes the higher frequency content, which may interfere with transmissions on the higher frequency channels. The output signal from filter 459 is the base band signal $y_0(t)$. With a combination of low pass filter 459 and high pass filter 215 coupled to summer 213, cross-channel interference between the base band channel, channel 301-0, and higher frequency channels 301-1 through 301-K can be minimized or eliminated.

Figure 4B:
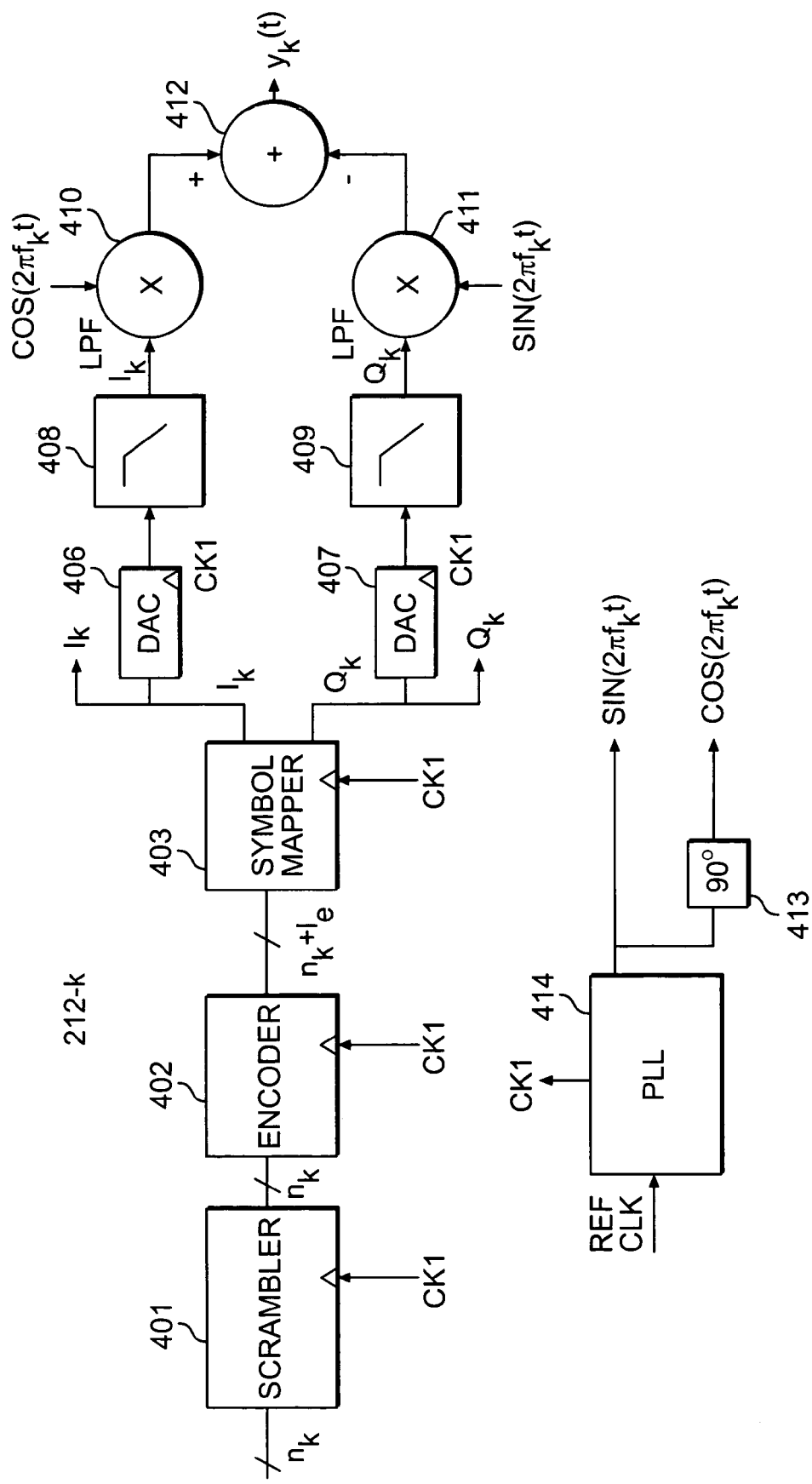

FIG. 4B shows a block diagram of an embodiment of up-converting modulator 212-$k$, an arbitrary one of up-conversion modulators 212-1 through 212-K of transmitter 270-$t$ (FIG. 2C). Up-converting modulator 212-$k$ receives $n_k$ bits per baud interval, 1/$B_k$, for transmission into sub-channel 301-$k$. The parameter $B_k$ denotes the baud rate, or symbol rate, of the transmission. The $n_k$ bits are received in scrambler 401. Scrambler 401 scrambles the $n_k$ bits and outputs a scrambled signal of $n_k$ bits, which whitens the data.

The output signal of $n_k$ parallel bits from scrambler 401 is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice-Hall, Inc., 1988), G. Ungerboeck., "Trellis Coding Modulation with Redundant Signal Sets, Part I. Introduction," IEEE Communications Magazine, vol. 25, no. 2, February 1987, pp. 5–11, and G. Ungerboeck., "Trellis Coding Modulation with Redundant Signal Sets, Part II. State of the Art," IEEE Communications Magazine, vol. 25, no. 2, February 1987, pp. 12–21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+le. In some embodiments, encoder 402 can be a trellis encoder which adds one additional bit, in other words encoder 402 can be a rate $n_k/n_k$+1 encoder, see, e.g., G. Ungerboeck., "Trellis Coding Modulation with Redundant Signal Sets, Part I. Introduction," IEEE Communications Magazine, vol. 25, no. 2, February 1987, pp. 5–11, and G. Ungerboeck., "Trellis Coding Modulation with Redundant Signal Sets, Part II. State of the Art," IEEE Communications Magazine, vol. 25, no. 2, February 1987, pp. 12–21. In some embodiments, additional bits can be added to insure a minimum rate of transitions so that timing recovery can be efficiently accomplished at receiver 220-$p$. Typically, the encoder is referred to as an $n_k/n_k$+le encoder.

The output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the ($n_k$+le) bits from encoder 402 onto a symbol set with at least $2^{(n_k+le)}$ symbols. A trellis encoder for encoder 402 in conjunction with a QAM mapper for symbol mapper 403 can provide a trellis encoded QAM modulation for sub-channel 301-$k$.

The encoded output bits from encoder 402 are input to mapper 403. In an example where $n_k$=6 and le=1, 7 bits from encoder 402 are input to mapper 403. If encoder 402 is the 16 state, rate 2/3 encoder discussed above, the 3 bit output of encoder 402 can be the 3 most-significant bits (MSBs) and the 4 uncoded bits can be the least-significant bits (LSBs).

In some embodiments, a 16 symbol QAM scheme can be utilized. In those embodiments, 4 bits with no encoding (or 3 bits in an 3/4 encoding scheme) can be directly mapped onto 16 QAM symbols. In some embodiments, 4 bits can be encoded (with a 4/5 encoding scheme) into a 32 QAM symbol set. In general, any size symbol set can be utilized.

The output signal from symbol mapper 403 can be a complex signal represented by in-phase signal $I_k(v)$ and a quadrature signal $Q_k(v)$, where v is an integer that represents the vth clock cycle of the clock signal CK1, whose frequency equals the baud rate $B_k$. Each of signals $I_k(v)$ and $Q_k(v)$ are digital signals representing the values of the symbols they represent. In some embodiments, a QAM mapper onto a constellation with 128 symbols can be utilized. Other constellations and mappings are well known to those skilled in the art, see, e.g., BERNARD SKLAR, DIGITAL COMMUNICATIONS, FUNDAMENTALS AND APPLICATIONS (Prentice-Hall, Inc., 1988) and E. A. LEE AND D. G. MESSERSCHMITT, DIGITAL COMMUNICATIONS (Kluwer Academic Publishers, 1988). The number of distinct combinations of $I_k(v)$ and $Q_k(v)$, then, represents the number of symbols in the symbol set of the QAM mapping and their values represent the constellation of the QAM mapping. Further examples of QAM symbol sets include 16 QAM symbol sets (16-QAM) and 4/5 encoded 32-QAM symbol sets (4/5 encoded 32 QAM).

The signals from symbol mapper 403, $I_k(v)$ and $Q_k(v)$, are input to digital-to-analog converters (DACs) 406 and 407, respectively. DACs 406 and 407 operate at the same clock rate as symbol mapper 403. In some embodiments, therefore, DACs 406 and 407 are clocked at the symbol rate, which is the transmission clock frequency $B_k$. The analog output signals from DACs 406 and 407, represented by $I_k(t)$ and $Q_k(t)$, respectively, can be input to low-pass filters 408 and 409, respectively. Low pass filters 408 and 409 are analog filters that pass the symbols represented by $I_k(t)$ and $Q_k(t)$ in the base band while rejecting the multiple frequency range reflections of the base band signal.

The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

However, because mixers 410 and 411 are typically not ideal mixers and the sine wave input to mixer 410, and the resulting cosine wave input to mixer 411, often varies from a sine wave, signals having harmonics of the frequency $f_k$ are also produced. Signals having frequency $2f_k$, $3f_k$, ... are also produced, as well as signals in the base band ($0f_k$). Although the amplitude of these signals may be attenuated with higher harmonics, they are non-negligible in the output signal. Even harmonics (i.e., $0f_k$, $2f_k$, $4f_k$ ... ) are absent if the duty cycle of the harmonic sine wave input to mixers is 50%. Otherwise, some component of all of the harmonics will be present.

The output signals from multipliers 410 and 411 are summed in summer 412 to form $$y_k(t) = \xi_k^0 I_k^{LPF}(t) - \zeta_k^0 Q_k^{LPF}(t) + \quad (1)$$
$$\sum_{n>0} (\xi_k^n I_k^{LPF} \cos(2\pi n f_k t) - \zeta_k^n Q_k^{LPF} \sin(2\pi n f_k t))(k \geq 1).$$

where $\xi_k^n$ and $\zeta_k^n$ is the contribution of the nth harmonic to $y_k(t)$. If the duty cycle of the harmonic input signals to mixers 410 and 411 is near 50%, the even harmonics are low and the odd harmonics are approximately given by $\xi_k^n$=1/n and $\zeta_k^n$=1/n.

The overall output of transmitter 210-$p$ (FIG. 2B), the output from summer 216, is then given by $$z(t) = \sum_{k=0}^{K} y_k(t). \quad (2)$$

In an example where the frequencies $f_1$ through $f_K$ are given by frequencies $f_0$ through ($Kf_0$), respectively, then, the overall output signal z(t) from transmitter 210-$p$ is given by:

$$z(t) = y_0(t) + \sum_{k=1}^{K} (\xi_k^0 I_k^{LPF}(t) - \zeta_k^0 Q_k^{LPF}) + \quad (3)$$
$$\xi_1^1 I_1^{LPF}(t) \cos\omega_0 t - \zeta_1^1 Q_1^{LPF}(t) \sin\omega_0 t +$$
$$(\xi_1^2 I_1^{LPF}(t) + \xi_2^1 I_2^{LPF}(t)) \cos 2\omega_0 t - (\zeta_1^2 Q_1^{LPF}(t) +$$
$$\zeta_2^1 Q_2^{LPF}(t)) \sin 2\omega_0 t + (\xi_1^3 I_1^{LPF}(t) + \xi_3^1 I_3^{LPF}(t)) \cos 3\omega_0 t -$$
$$(\zeta_1^3 Q_1^{LPF}(t) + \zeta_3^1 Q_3^{LPF}(t)) \sin 3\omega_0 t + (\xi_1^4 I_1^{LPF}(t) +$$
$$\xi_2^2 I_2^{LPF}(t) + \xi_4^1 I_4^{LPF}(t)) \cos 4\omega_0 t - (\zeta_1^4 Q_1^{LPF}(t) +$$
$$\zeta_2^2 Q_2^{LPF}(t) + \zeta_4^1 Q_4^{LPF}(t)) \cos 4\omega_0 t + \ldots$$
$$= y_0(t) + \sum_{k=1}^{K} (\xi_k^0 I_k^{LPF}(t) - \zeta_k^0 Q_k^{LPF}(t)) +$$
$$\sum_{M=1}^{\infty} \sum_{\forall k, n \in k^*n = M} (\xi_k^n I_k^{LPF}(t) \cos M\omega_0 t - \zeta_k^n Q_k^{LPF}(t) \sin M\omega_0 t)$$

where $\omega_0$ is $2\pi f_0$ and where $I_k^{LPF}(t)$ and $Q_k^{LPF}(t)$ are 0 for all k>K.

As shown in Equation 3, the signal on channel one is replicated into all of the higher K channels, the base-band, and into harmonic frequencies beyond the base-band and the K channels. Filter 215 can remove the contribution to the base-band channel from up-converting modulators 212-1 through 212-K. Further, the attenuation of the signals with higher harmonics in some systems can be such that the signal from channel k is non negligible for a large number of harmonics, potentially up to the bandwidth of the process, which can be 30–40 GHz.

In some embodiments of the invention, a high pass filter 215 (see FIG. 2C) receives the signal from summer 213. High pass filter 215 can, for example, be a first-order high-pass filter with 3 dB attenuation at $f_1/2$. Filter 215 removes the DC harmonics, i.e. the base-band transmissions, from the transmitter. In embodiments with a separate base-band transmission, then, cross-channel coupling into the base-band is minimized or eliminated. Further, removing the base-band harmonics from the transmitted signals simplifies cross-channel cancellation at receiver 220-$p$. In embodiments where high pass filter 215 exists, most of the base-band contribution from each of up-converting modulators 212-1 through 212-K, $$\sum_{k=1}^{K} (\xi_k^0 I_k^{LPF}(t) - \zeta_k^0 Q_k^{LPF}(t)),$$

is filtered out and becomes close to 0. The output signal from transmitter 210-$p$ then becomes $$z'(t) = \qquad (4)$$
$$y_0(t) + \sum_{M=1}^{\infty} \sum_{\forall k, n \in k^* n = M} (\xi_k^n I_k^{LPF}(t)\cos M\omega_0 t - \zeta_k^n Q_k^{LPF}(t)\sin M\omega_0 t).$$

In some embodiments of the invention, DACs 406 and 407 of the embodiment of up-converting modulator 212-$k$ shown in FIG. 4B may be moved to receive the output of summer 412. Further, in some embodiments DACs 406 and 407 can be replaced by a single DAC to receive the output of summer 213. However, such DACs should have very high sampling rates. One advantage of utilizing high-sampling rate DACs is that ideal mixing could take place and the number of harmonics that need to be cancelled can be greatly reduced or even eliminated.

As an example, then, embodiments of transmitter 210-$p$ capable of 10 Gbps transmission can be formed. In that case, $\eta=10$, i.e., an overall throughput of 10 Gbps from the transmitter to the receiver. Some embodiments, for example, can have (K+1)=8 channels 301-0 through 301-7. Channels 301-1 through 301-7 can be 6/7 trellis encoded 128 QAM with the baud rate on each channel $B_k$ being 1.25 GHz/6 or about 208.333 Msymbols/sec. In another example, channel 301-0, the base-band channel, can be PAM-8 with no error correction coding (i.e., uncoded PAM-8) with baud rate $B_0$ being 416.667 Msymbols/sec. In that example, channels 301-1 through 301-7 can have $n_k=6$; $1 \leq k \leq 7$ and encoder 402 is a 6/7 rate trellis encoder. In this example, channels 301-1 through 301-7 can be transmitted at frequencies $2f_0$, $3f_0$, $4f_0$, $5f_0$, $6f_0$, $7f_0$ and $8f_0$, respectively, where $f_0$ can be, for example, $1.5 * B_k$ or 312.5 MHz.

Figure 2E:
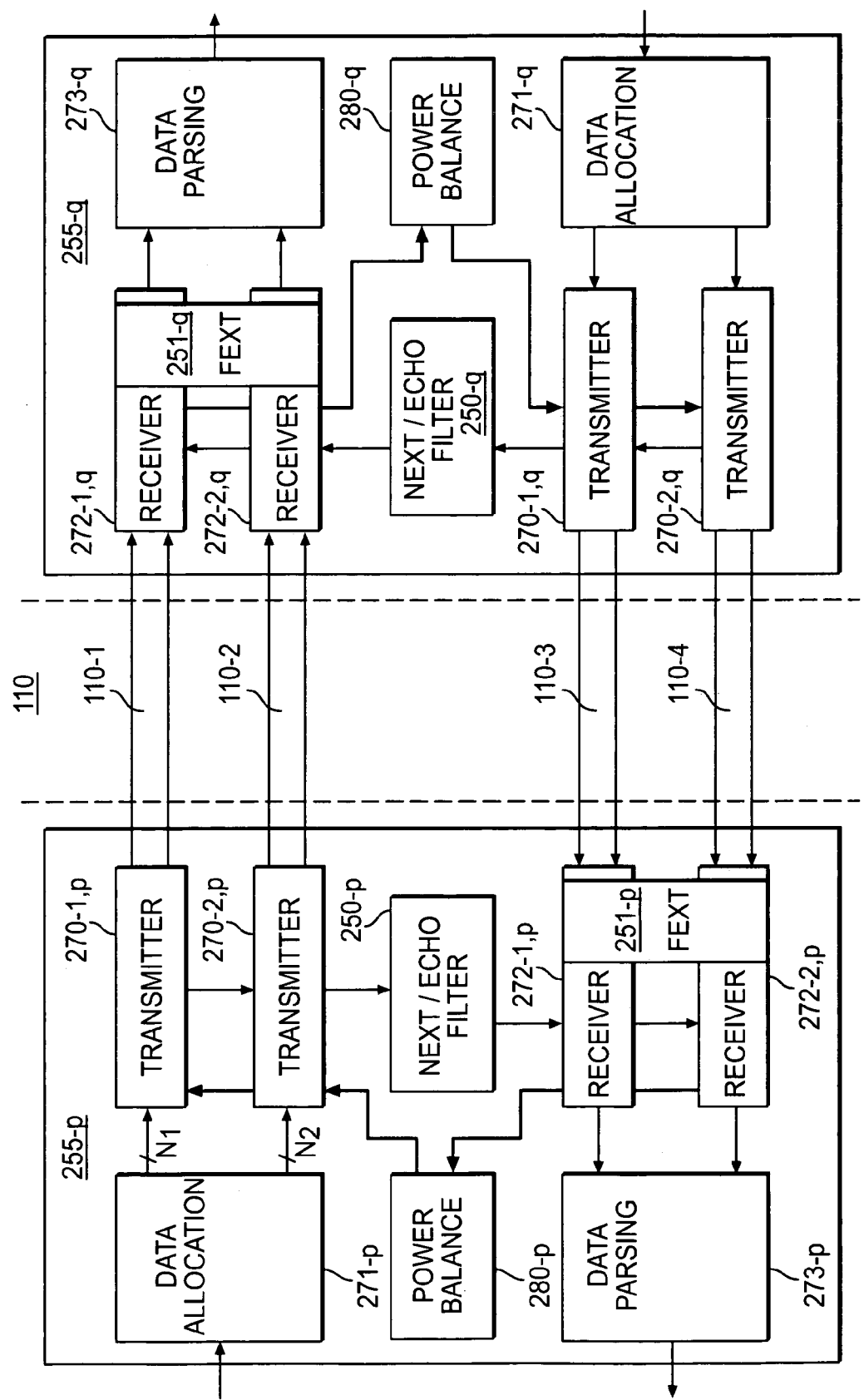
FIG. 2E shows a block diagram of an embodiment of a transceiver pair configuration according to the present invention.

In some embodiments of the invention, as shown in FIG. 2E, transceiver 255-$p$ include two receivers (i.e., receivers 272-1,$p$ and 272-2,$p$) and two transmitters (i.e., transmitters 270-1,$p$ and 270-2,$p$). Transceiver 255-$p$ is coupled to a complementary transceiver 255-$q$ through, for example, four pairs of category 5, 5E or 6 cabling, as shown in transmission medium 110 as media 110-1, 110-2, 110-3 and 110-4 in FIG. 2E. As shown in FIG. 2E, transceiver 255-$q$ also includes two receivers (i.e., receivers 272-1,$q$ and 272-2,$q$) and two transmitters (i.e. 270-1,$q$ and 270-2,$q$) complementarily coupled to transceiver 255-$p$, i.e. transmitter 270-1,$p$ of transceiver 255-$p$ is coupled through media 110-1 to receiver 272-1,$q$ of transceiver 255-$q$; transmitter 270-2,$p$ of transceiver 255-$p$ is coupled through media 110-2 to receiver 272-2,$q$ of transceiver 255-$q$; receiver 272-1,$p$ of transceiver 255-$p$ is coupled through media 110-3 to transmitter 270-1,$q$ of transceiver 255-$q$; and receiver 272-2,$p$ of transceiver 255-$p$ is coupled through media 110-4 to transmitter 270-2,$q$ of transceiver 255-$q$.

In some embodiments as shown in FIG. 2E, each of transmitters 270-1,$p$ and 270-2,$p$ of transceiver 255-$p$ and transmitters 270-1,$q$ and 270-2,$q$ of transceiver 255-$q$ transmits utilizing four (4) channels with frequencies $f_0$, $2f_0$, $3f_0$ and $4f_0$, where $f_0$ is about 312.5 MHz (a factor of 1.5 times the baud rate) and a baud rate of 208.333 Msymbols/sec. The embodiments of transceivers 255-$p$ and 255-$q$ can utilize QAM128 symbols with the 6/7 trellis code. The resulting system can transmit a total of 10 Gbits/sec in each direction between transceiver 255-$p$ and 255-$q$.

Receivers 272-1,$p$ and 272-2,$p$ of transceiver 255-$p$ provide signals to power balance 280-$p$. Transmitters 270-1,$p$ and 270-2,$p$ then receive gain values for each channel transmitted by transmitters 270-1,$p$ and 270-2,$p$, respectively, from power balance 280-$p$. In some embodiments, data from only one of receiver 272-1,$p$ or 272-2,$p$ is utilized to produce gain values for each of transmitters 270-1,$p$ and 270-2,$p$. In some embodiments, data from receiver 272-1,$p$ is utilized to provide gain values for one of transmitters 270-1,$p$ and 270-2,$p$ and data from receiver 272-2,$p$ is utilized to provide gain values for the other one of transmitters 270-1,$p$ and 270-2,$p$. In some embodiments, the new gain values for transmitters 270-1,$p$ and 270-2,$p$ are calculated based on the power level of data received in receiver 272-1,$p$ and/or receiver 272-2,$p$. Similar to power balance 280-$p$, power balance 280-$q$ of transceiver 255-$q$ provides gain values for transmitters 270-1,$q$ and 270-2,$q$ based on data from receivers 272-1,$q$ and 272-2,$q$.

Figure 2F:
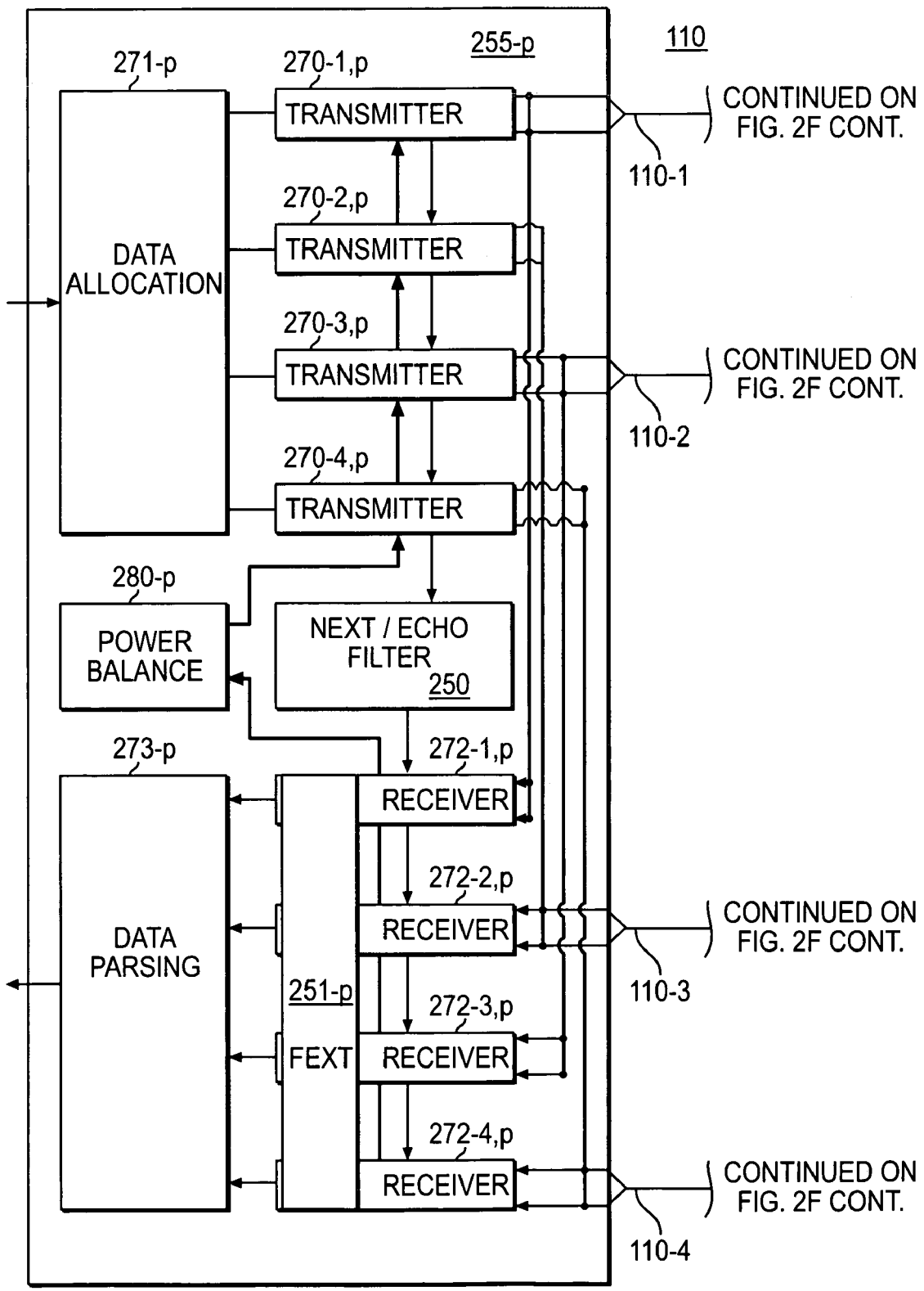
FIG. 2F shows a block diagram of another embodiment of a transceiver pair configuration according to the present invention.
Figure 2F:
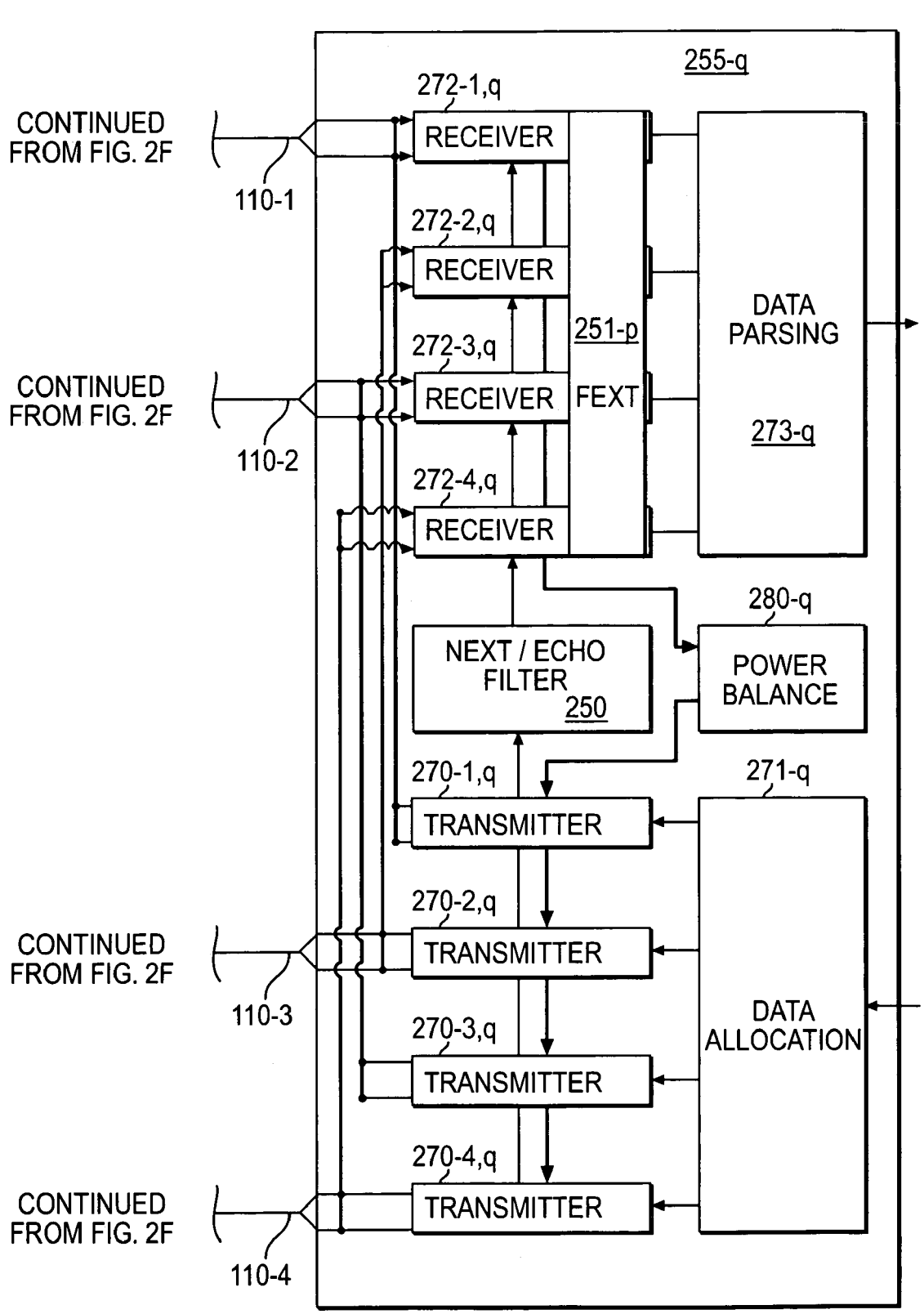

FIG. 2F shows another embodiment of communicating complementary transceivers 255-$p$ and 255-$q$. In the embodiment shown in FIG. 2F, transceiver 255-$p$ includes four (4) transmitters 270-1,$p$ through 270-4,$p$ and four (4) receivers 272-1,$p$ through 272-4,$p$. Complementary transceiver 255-$q$ also includes four (4) transmitters 270-1,$q$ through 270-4,$q$ and four (4) receivers 272-1,$q$ through 272-4,$q$. Transmitters 270-1,$p$ through 270-4,$p$ of transceiver 255-$p$ are coupled to receivers 272-1,$q$ through 272-4,$q$ of transceiver 255-$q$ through four (4) media 110-1 through 110-4 of transmission medium 110. Conversely, transmitters 270-1,$q$ through 270-4,$q$ of transceiver 255-$q$ are coupled to receivers 272-1,$p$ through 272-4,$p$ of transceiver 255-$p$ through the same four (4) media 110-1 through 110-4. Each of media 110-1 through 110-4 carries full-duplex data, i.e. data flows both directions. Therefore, transmitter 270-1,$p$ of transceiver 255-$p$ is coupled to receiver 272-1,$q$ of transceiver 255-$q$ and receiver 272-1,$p$ of transceiver 255-$p$ is coupled to transmitter 270-1,$q$ of transceiver 255-$q$ through media 110-1; transmitter 270-2,$p$ of transceiver 255-$p$ is coupled to receiver 272-2,$q$ of transceiver 255-$q$ and receiver 272-2,$p$ of transceiver 255-$p$ is coupled to transmitter 270-2,$q$ of transceiver 255-$q$ through media 110-2; transmitter 270-3,$p$ of transceiver 255-$p$ is coupled to receiver 272-3,$q$ of transceiver 255-$q$ and receiver 272-3,$p$ of transceiver 255-$p$ is coupled to transmitter 270-3,$q$ of transceiver 255-$q$ through media 110-3; transmitter 270-4,$p$ of transceiver 255-$p$ is coupled to receiver 272-4,$q$ of transceiver 255-$q$ and receiver 272-4,$p$ of transceiver 255-$p$ is coupled to transmitter 270-4,$q$ of transceiver 255-$q$ through media 110-4.

Media 110-1 through 110-4 can be, for example, category 5, 5E or 6 copper pairs. Each of transmitters 270-1,$p$ through 270-4,$p$ of transceiver 255-$p$ and transmitters 270-1,$q$ through 270-4,$q$ of transceiver 255-$q$ includes two channels with a baud rate of 208.333 Msymbols/sec each. Again, $f_0$ can be 312.5 MHz, or 1.5 times the baud rate. Again, a QAM128 symbol set may be utilized with 6/7 trellis encoding. The resulting total transmission rate is 10 Gbits/sec in each direction.

In some embodiments of the configuration shown in FIG. 2F, transmitters 270-1,$p$ through 270-4,$p$ of transceiver 255-$p$ through and the complementary receivers 272-1,$q$ through 272-4,$q$ of transceiver 255-$q$ operate with channels at different frequencies than transmitters 270-1,$q$ through 270-4,$q$ of transceiver 255-$q$ and the complementary receivers 272-1,$p$ through 272-4,$p$ of transceiver 255-$p$. For example, transmitters 270-1 through 270-4 of transceiver 255-$p$ may each transmit on channels with carrier frequencies $f_0$ and $3f_0$ while transmitters 270-1 through 270-4 of transceiver 255-$q$ transmit on channels with carrier frequencies $2f_0$ and $4f_0$. However, in some embodiments of the invention, transmitters 270-1 and 270-2 of transceiver 255-$p$ and transmitters 270-1 and 270-2 of transceiver 255-$q$ transmit using the same set of frequencies, $f_0$ and $2f_0$.

As shown in FIG. 2F, receivers 272-1,$p$ through 272-4,$p$ provide data to power balance 280-$p$ in order to set gain values in transmitters 270-1,$p$ through 270-4,$p$. Similarly, receivers 272-1,$q$ through 272-4,$q$ of transceiver 255-$q$ provide data to power balance 280-$q$ to set gain values in transmitters 270-1,$q$ through 270-4,$q$. In embodiments where transmitter 270-1,$p$ and transmitter 270-1,$q$, which share transmission medium 110-1, utilize the same set of center frequencies, then receiver 272-1,$p$ can provided data related to the signal power of data received from transmitter 270-1,$q$ in order to set gain values in transmitter 270-1,$p$. Similarly, receiver 272-1,$q$ can provide data based on the signal power of data received from transmitter 270-1,$p$ in order to set gain values in transmitter 270-1,$q$. This method of setting the gain values in transmitter 270-1,$p$ has the advantage of relying only on information readily available within transceiver 255-$p$ and assumes that transmitter 270-1,$p$ is substantially the same as transmitter 270-1,$q$. The gain values for transmitters 270-2,$p$ through 270-4,$p$ can also be set utilizing data related to received signal power in receivers 272-2,$p$ through 272-4,$p$, respectively. Similarly, the gain values for transmitters 270-2,$q$ through 270-4,$q$ are determined from data related to the signal power received by receivers 272-2,$q$ through 272-4,$q$.

In embodiments where transmitter 270-1,$p$ and transmitter 270-1,$q$ utilize different sets of channels (for example if transmitter 270-1,$p$ utilizes channels with center frequencies $f_0$ and $3f_0$ and transmitter 270-1,$q$ utilizes channels with center frequencies $2f_0$ and $4f_0$), then in some embodiments gain values can be predicted based on a model of the characteristics of transmission medium 110-1 and power data for the channels received by receiver 272-1,$p$. In some embodiments, the gain values for transmitter 270-1,$p$ are determined by receiver 272-1,$q$. In those embodiments, receiver 272-1,$q$ provides, through power balance 280-$q$, data to be transmitted to receiver 272-1,$p$ by transmitter 270-1,$q$. In some embodiments, the gain values in transmitters 270-1,$p$ through 270-4,$p$ can be set during an initial start-up training session. Similar methods of setting the gain values for transmitters 270-2,$p$ through 270-4,$p$ and 270-2,$q$ through 270-4,$q$ can be utilized.

In another example embodiment systems according to the present invention, 10 Gbps ($\eta=10$) can utilize (K+1)=2 channels 301-0 and 301-1. Channel 301-1 can be, for example, 16 QAM with no error correction coding (i.e., uncoded 16-QAM) with baud rate $B_1$ of 1.25 GHz and channel 301-0 can be, for example, 16-PAM with no error correction coding (i.e., uncoded 16-PAM) with baud rate $B_0$ at 1.25 GHz. The baud rate for both the PAM channel and the QAM channel is then 1.25 Gsps. The throughput is 5 Gbps each for a total transmission rate of 10 Gbps. With an excess bandwidth of the channels of about 50%, the center frequency of the QAM channel can be $f_1 \geq (1.5)*1.25$ GHz or above about 1.8 GHz.

In another example embodiment, 10 Gbps can utilize (K+1)=2 channels 301-0 and 301-1 as in the previous example with channel 301-1 being a 4/5 trellis encoded 32 QAM with a baud rate $B_1$ of 1.25 GHz with channel 301-0 being uncoded 16-PAM with baud rate $B_0$ of 1.25 GHz. Again, the center frequency of channel 301-1 can be $f_1 \geq (1.5)*1.25$ GHz or above about 1.8 GHz.

In yet another example, (K+1)=6 channels, channels 301-0 through 301-5, can be utilized. Channels 301-1 through 301-5 can be 6/7 trellis encoded 128-QAM with baud rate $B_k$ of 1.25 GHz/6 or 208 MHz. Channel 301-0, the base-band channel, can be 3/4 encoded 16 PAM or uncoded 8-PAM with baud rate $B_0=1.25$ GHz. The center frequencies of channels 301-1 through 301-5 can be $4f_0$, $5f_0$, $6f_0$, $7f_0$, and $8f_0$, respectively, with $f_0$ being about 312.5 MHz.

Although several different embodiments are specifically described here, one skilled in the art will recognize that many other configurations of transceivers according to the present invention are possible. One can arrange the number of transmitters and complementary receivers and the number of channels per transmitter in any way, depending on the desired baud rate and transceiver complexity. It is recognized that a given desired baud rate can be achieved by providing transceivers with a small number of transmitters transmitting on a large number of channels or a larger number of transmitters on a smaller number of channels. Further, data can be transmitted in half-duplex or full-duplex mode over the transmission medium. Again, the filtering demands will be different for half-duplex or full-duplex transmission. For example, Echo filtering should be included in full-duplex transmission, but may not be useful in half-duplex transmission.

Figure 5A:
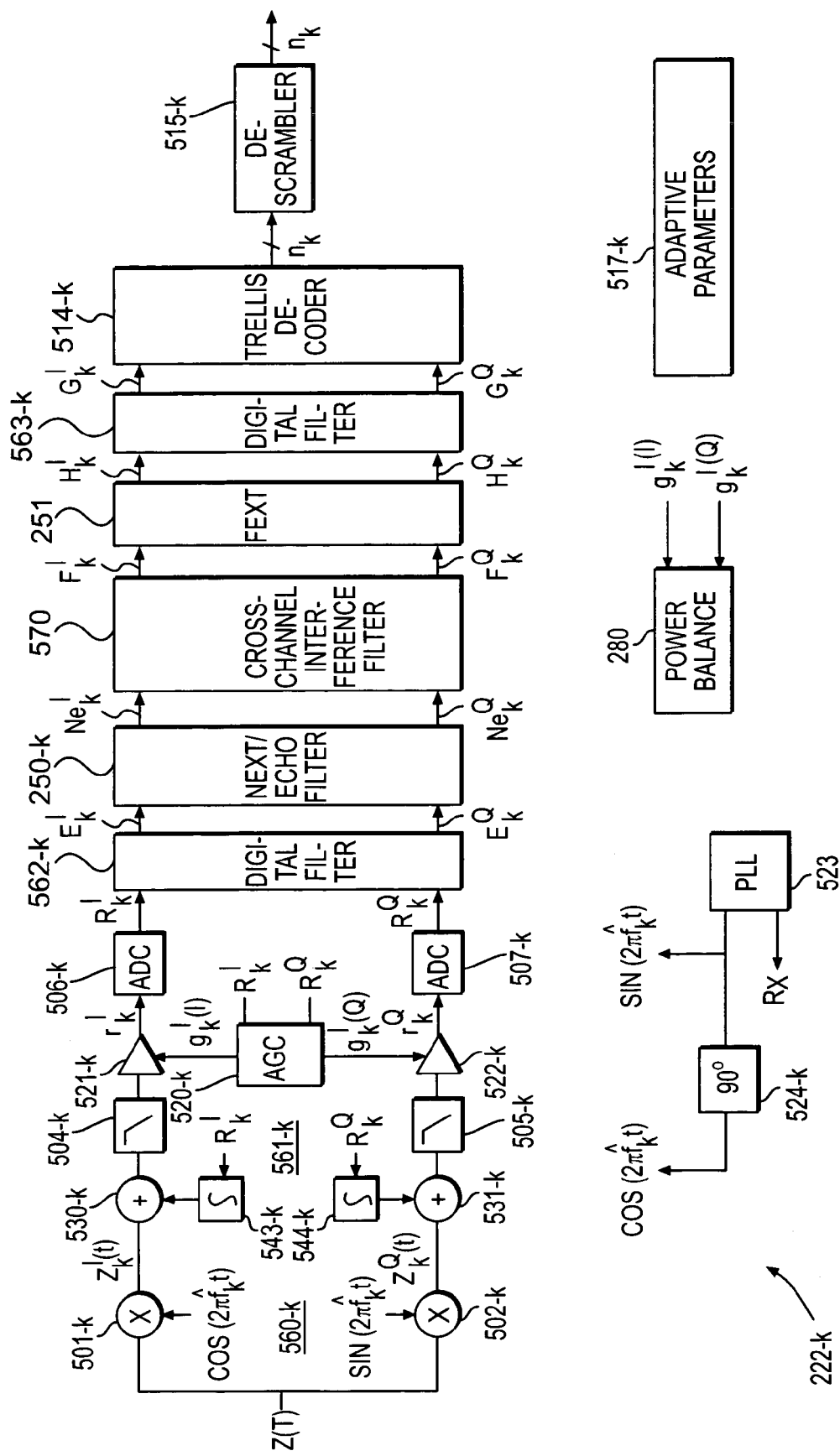
FIGS. 5A and 5B show block diagrams of an embodiment of a receiver according to the present invention.

FIG. 5A shows a block diagram of an embodiment of down-converting demodulator 222-$k$ of receiver 272-$r$ as shown in FIGS. 2B and 2D (the index to transceiver is omitted). Receiver 272-$r$ is adjacent to transmitters 270-1 through 270-T and is paired with transmitter 270-$t$, as shown in FIG. 2B. Furthermore, receiver 272-$r$ receives data from a complementary transmitter over transmission medium 110. In this embodiment, transmitter 270-$t$ and receiver 272-$r$ utilize the same set of transmission channels.

As shown in FIG. 2D, receiver 272-$r$ of receiver portion 220-$p$ includes demodulators 221-1 through 221-K and possibly base-band demodulator 223 to form a (K+1)-channel receiver. Some embodiments do not include base-band demodulator 223. The output signals from receiver input buffer 224, Z(t), are received in each of down-converting demodulators 222-1 through 222-K and base-band demodulator 223 of receiver 272-$r$. The signal Z(t), then, is the transmitted signal z(t) from the complementary transmitter after transmission through transmission medium 110. As shown in FIG. 3, the attenuation of signals at each of the K carrier frequencies utilized by transmitter 272-r after transmission through medium 110 can be different. Additionally, the signal Z(t) suffers from inter-symbol interference caused by the dispersive effects of medium 110.

The dispersive effects cause the signals received within a particular timing cycle to be mixed with those signals at that carrier frequency received at previous and future timing cycles. Therefore, in addition to cross-channel interference effects caused by the harmonic generation in mixers of the complementary transmitter (which is a transmitter of one of transmitter portions 210-1 through 210-P), but also the signals for each channel are temporally mixed through dispersion effects in medium 110. Also, the signal received at input buffer 224 includes near-end cross talk and echo interference from transmitters 270-1 through 270-T of transmitter portion 210-p of transceiver 255-p (see FIG. 2B). Further, FEXT interference results from the interference from the other transmitters at the far end (i.e., the complementary transceiver) communicating with receiver 272-1 thorough 272-R. Therefore, the input signal Z(t) at input buffer 224 includes the signal transmitted by the complementary transmitter a contribution from the output signals transmitted by transmitters 270-1 through 270-T and a signal transmitted by other transmitters at the complementary transceiver.

FIG. 5A illustrates embodiments of down-converting demodulator 222-k, an arbitration one of demodulators 222-1 through 222-K of transmitter 272-r. Signal Z(t) is received by down-converting demodulators 222-k into down converter 560-k which down converts the channel transmitted at frequency $f_k$ back into the base-band and recovers in-phase and quadrature components $Z_k^I(t)$ and $Z_k^Q(t)$, respectively.

Down converter 560-k down converts the signal from Z(t) by a frequency $\hat{f}_k$ in mixers 501-k and 502-k. Mixer 501-k mixes Z(t) with the function $\cos(2\pi\hat{f}_k^t)$ to generate the in-phase component $Z_k^I(t)$. Mixer 502-k mixes Z(t) with the function $\sin(2\pi\hat{f}_k^t)$ to generate the quadrature component $Z_k^Q(t)$.

The frequency $\hat{f}_k$ can be the locally generated estimate of the carrier center frequency $f_k$ from the complementary transmitter. The clock signals within component 201-p, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the complementary transmitter and $\{\hat{f}_k\}$ denotes the set of frequencies at receiver 272-r. In some embodiments, the frequencies utilized for each of the channels for transceiver 255-p as a whole are fixed.

As shown in FIG. 5A, PLL 523 generates the clock signals for each of down-converting demodulators 222-1 through 222-K and base-band demodulator 223 and, in particular, generates the $\sin(2\pi\hat{f}_k^t)$ signal for down-converting demodulator 222-k. The $\cos(2\pi\hat{f}_k^t)$ signal can be generated by the π/2 phase shifter 524-k coupled to PLL 523. PLL 523 also generates the sampling clock signal utilized in analog to digital converters (ADCs) 506-k and 507-k as well as other timing signals utilized in down-converting demodulator 222-k. PLL 523 also generates an RX CLK signal for output with the $n_k$ bit output signal from down-converting demodulator 222-k of receiver 272-r.

Down converters 560-1 through 560-K also generate harmonics for very much the same reasons that harmonics are generated in up-converting modulators 212-1 through 212-K. Therefore, down converter 560-k will down-convert into the base-band signals from signals having center frequencies 0, $\hat{f}_k$, $2\hat{f}_k$, $3\hat{f}_k$, . . . Signals in each of the channels also include the cross-channel interference generated by the transmitter mixers and the dispersive interference created by the channel. If the base-band component of the harmonics is not filtered out by filter 215 (FIG. 2C), then every channel could put a copy of its transmit signal onto the base-band and every channel will receive the base-band signal at the receive side. The signals $Z_k^I(t)$ and $Z_k^Q(t)$ also will include interference from near-end cross talk (NEXT) and possibly Echo, far-end cross-talk (FEXT), intersymbol interference, and cross-channel interference. As an additional complicating factor, in some embodiments the transmitter and receiver clocks of a complimentary communicating transmitter/receiver pair can be different, which can be corrected by a frequency shifter coupled to PLL 523 that adjusts the frequency output from PLL 523 so that the frequency of the transmitter/receiver pair are the same.

The output signals from down-converter 560-k, $Z_k^I(t)$ and $Z_k^Q(t)$, are input to analog filter 561-k. In some embodiments, analog filter 561-k can provide offset correction with summers 530-k and 531-k, low-pass filters 504-k and 505-k, and amplifiers 521-k and 522-k. Summers 530-k and 531-k can correct for any leakage onto signal Z(t) from the sine and cosine signals provided by PLL 523, plus any DC offset in filters 504-k and 505-k and ADCs 506-k and 507-k. The DC offset values can be adaptively chosen and, in some embodiments, after an initial start-up procedure, the DC offset values can be fixed. In the embodiment shown in FIG. 5A, the offset values for summers 530-k and 531-k are determined by integrators 543-k and 544-k, respectively, utilizing the output signal from analog-to-digital converters 506-k and 507-k, respectively.

Low-pass filters 504-k and 505-k of analog filter 561-k can, in some embodiments, provide filtering for removing signals in $Z_k^I(t)$ and $Z_k^Q(t)$, respectively, that are not associated with signals at the base-band of down-converting demodulator 222-k. Additionally, amplifiers 521-k and 522-k provide amplification. The gains $g_k^{1(I)}$ and $g_k^{2(Q)}$ of amplifiers 521-k and 522-k, respectively, can be determined by an automatic gain control (AGC) 520-k from the output signals from ADC converters 506-k and 507-k, respectively. The output signals from analog filter 561-k, then, can be $$r_k^I(t) = LPF[Z(t)\cos(2\pi\hat{f}_k t)]g_k^{1(I)}$$

$$r_k^Q(t) = LPF[Z(t)\sin(2\pi\hat{f}_k t)]g_k^{1(Q)}. \quad (5)$$

In the embodiment of receiver 272-r illustrated in FIG. 5A, the gain values $g_k^{1(I)}$ and $g_k^{2(Q)}$ are input to power balance 280 in order to determine the gain $g_k^t$ of the complementary transmitter 270-t that is in communication with receiver 272-r.

The signals output from analog filter 561-k, signals $r_k^I(t)$ and $r_k^Q(t)$, are input to analog-to-digital converters (ADC) 506-k and 507-k, respectively, which forms digitized signals $R_k^I(v)$ and $R_k^Q(v)$ corresponding with the analog signals $r_k^I(t)$ and $r_k^Q(t)$, respectively. The integer index v indicates the number of clock cycles of the system clock, which is usually operating at the transmission symbol rate. In some embodiments, ADCs 506-k and 507-k operate at a sampling rate that is the same as the transmission symbol rate, e.g. the QAM symbol rate. In some embodiments, ADCs 506-k and 507-k can operate at higher rates, for example twice the QAM symbol rate. The timing clock signal SCLK, as well as the sine and cosine functions of Equation 5, is determined by PLL 523. In outputs with $\eta=10$, $K=4$, $n_k=6$ and two transmission media, as described above, ADCs 506-$k$ and 507-$k$ can operate at a rate of about 208.333 Msymbols/sec or, in embodiments with $K=8$ and two transmission media, about 104.167 Msymbols/sec. In some embodiments, ADCs 506-$k$ and 507-$k$ can be 8-bit ADCs. However, for 128 QAM operation, anything more than 7 bits can be utilized. In some embodiments, the gain of amplifiers in analog filters 560-$k$ can be set by automatic gain control circuit (AGC) 520-$k$ based on the digital output signals from ADCs 506-$k$ and 507-$k$, $R_k^I(v)$ and $R_k^Q(v)$, respectively.

The output signals from ADCs 506-$k$ and 507-$k$, $R_k^I(v)$ and $R_k^Q(v)$, respectively, are input to a first digital filter 562-$k$. In some embodiments of the invention, the in-phase and quadrature data paths may suffer from small differences in phase, denoted $\theta_k^c$, and small differences in gain. Therefore, in some embodiments a phase and amplitude correction is included in digital filter 562-$k$. In order to correct the phase and amplitude between the in-phase and quadrature data paths, one of the values $R_k^I(v)$ and $R_k^Q(v)$ is assumed to be of the correct phase and amplitude. The opposite value is then corrected. The phase error can be corrected by using the approximation for small $\theta_k^c$ where $\sin \theta_k^c$ is approximately $\theta_k^c$, and $\cos \theta_k^c$ is approximately one. As an example, assume that the value for $R_k^I(v)$ is correct, the value for $R_k^Q(v)$ is then corrected. This correction can be implemented by subtracting the value $\theta_k^c R_k^I(v)$ from $R_k^Q(v)$, for example. The amplitude of $R_k^Q(v)$ can also be corrected by adding a small portion $\eta_k^c$ of $R_k^Q(v)$. The values $\eta_k^c$ and $\theta_k^c$ can be adaptively determined in adaptive parameters block 517-$k$. Additionally, an arithmetic offset can be implemented by subtracting an offset value from each of $R_k^I(v)$ and $R_k^Q(v)$. The offset values can also be adaptively chosen in adaptive parameter block 517-$k$.

Further, a phase rotation circuit can also be implemented in first digital filter 562-$k$. The phase rotation circuit rates both the in-phase and quadrature signals by an angle $\hat{\theta}_k^1$. The angle $\hat{\theta}_k^1$ can be adaptively chosen and depends on the difference between $\hat{f}_k$ and $f_k$.

Also, a digital equalizer can also be implemented in digital filter 562-$k$. Digital filter 562-$k$ can be any combination of linear and decision feed-back equalizers, the coefficients of which can be adaptively chosen in adaptive parameters 517-$k$.

In the embodiment of the invention shown in FIG. 5A, the complex adaptive equalizer included in digital filter 562-$k$ can counter the intersymbol interference caused by frequency dependent channel attenuation, and the reflections due to connectors and vias that exist in communication system 200 (which can be a backplane communication system, an inter-cabinet communication system, or a chip-to-chip communication system) and both transmit and receive low pass filters. It should be noted that because of the frequency division multiplexing of data signals, as is accomplished in transmitter system 210-$p$ and receiver system 220-$p$, the amount of equalization needed in any one of channels 301-0 through 301-K is minimal. In some embodiments, such as the 16-channel, 6 bit per channel, 10 Gbps example, only about 1–2 dB of transmission channel magnitude distortion needs to be equalized. In 8-channel embodiments, 3–4 dB of distortion needs to be equalized. In other words, the number of taps required in a transport function for the equalizer can be minimal (e.g., 1–4 complex taps) in some embodiments of the present invention, which can simplify receiver 220-$p$ considerably. In some embodiments of the invention, the equalizer can have any number of taps. In some embodiments, NEXT/Echo filter 250 may be implemented before cross-channel interference filter 570 and FEXT filter 251.

The embodiment of demultiplexer 222-$k$ shown in FIG. 5A further includes NEXT/echo filter 250-$k$, cross-channel interference filter 570, and FEXT filter 251. The output signals from digital filter, $E_k^I(v)$ and $E_k^Q(v)$, can be input to NEXT/Echo filter 250-$k$. The output signals from NEXT/Echo filter 250-$k$, $Ne_k^I$ and $Ne_k^Q$, can then be input to cross-channel interference filter 570. The output signals from cross-channel interference filter 570, $F_k^I$ and $F_k^Q$, can then be input to FEXT filter 251. The output signals from FEXT filter 251, $H_k^I$ and $H_k^Q$, can then be input to a second digital filter 563-$k$. The output signals from digital filter 563-$k$, $G_k^I$ and $G_k^Q$, are then input to trellis decoder 514-$k$. The output signal from trellis decoder 514-$k$ is then input to descrambler 515-$k$. Parameters for controlling demodulator 222-$k$, including parameters for filters 562-$k$, 250-$k$, 570, 251, 563-$k$, and 514-$k$, can be chosen adaptively in adaptive parameters block 517-$k$.

Further discussion of cross channel interference canceller 570 and the adaptively chosen coefficients can be found in U.S. application Ser. No. 10/310,255, filed on Dec. 4, 2002, which has been incorporated by reference into this application in its entirety. Further discussion regarding aspects of receiver 222-$k$ can be found in U.S. application Ser. No. 10/454,382, filed on Jun. 3, 2003, which has been incorporated by reference into this application in its entirety.

Figure 5B:
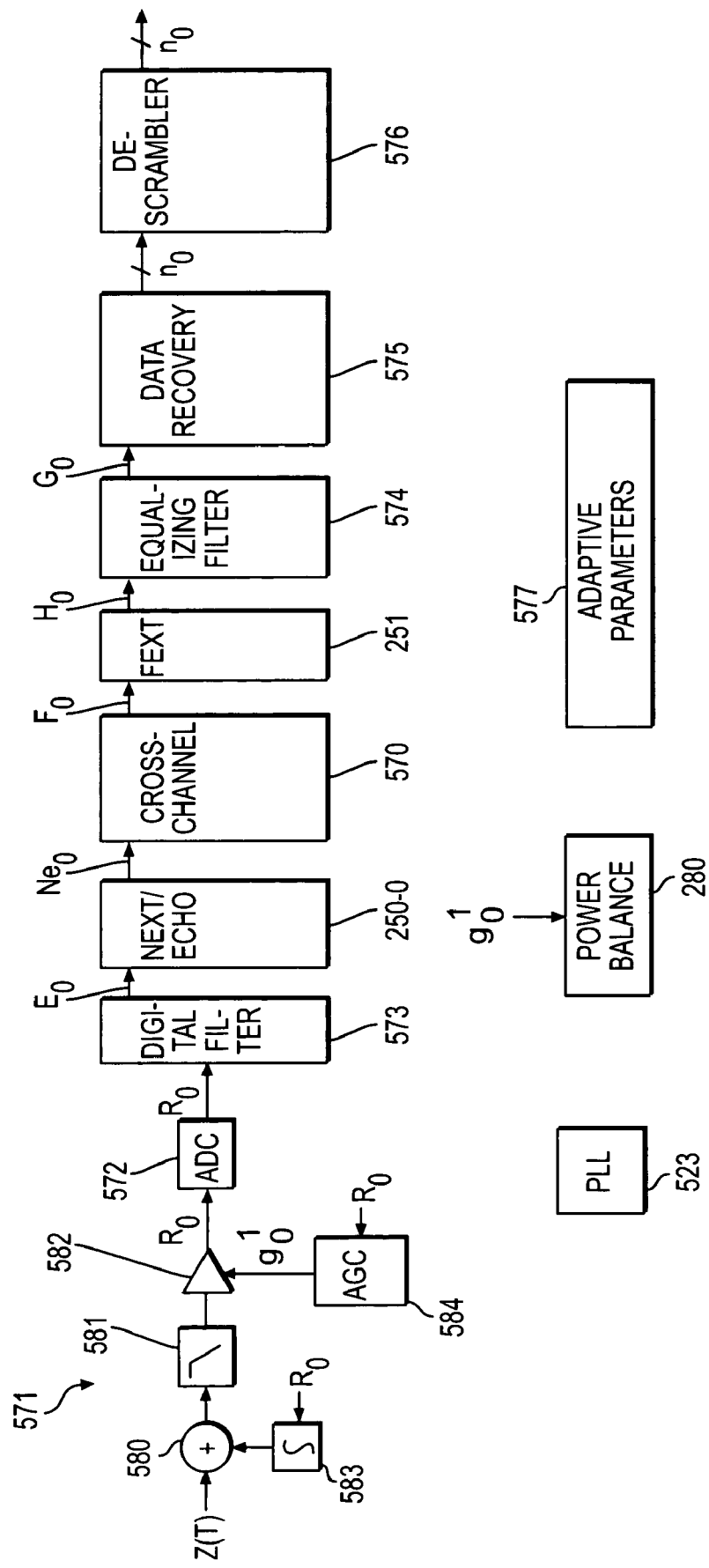

FIG. 5B shows a block diagram of a base-band demodulator 223. Base-band demodulator 223 also receives the signal Z(t) from medium 110. Analog processing 571 in base-band demodulator 223 receives signal Z(t). FIG. 5B shows an embodiment of analog processing 571 that includes a summer 580, a low-pass filter 581, and an amplifier 582. Low-pass filter 581 separates the base-band signal from those signals transported with carrier frequencies, such as those transmitted by up-converting modulators 212-1 through 212-K. Amplifier 582 can correct for low signal strength. In some embodiments, the gain of amplifier 582, $g_0^1$, can be determined in an AGC 584. In some embodiments, AGC 584 can determine the gain $g_0^1$ based on the output signal from ADC converter 572, $R_0$. In some embodiments, the offset utilized in summer 580 can be determined from the output from ADC converter 572, $R_0$, in integrator 583. Processor 571 can further include some analog correction of the signals, including anti-aliasing filters, base-line wander filters, or other filters.

The output signal from analog processing 571 is input to ADC 572, where it is digitized. ADC 572 can have any number of bits of resolution. At least a four bit ADC, for example, can be utilized in a 16-PAM system. ADC 572 can be clocked from a clock signal generated by receiver 120-$p$ in general, for example in PLL 523 as shown in FIG. 5B. In some embodiments, adaptive parameter control 577 can generate a phase signal which can add a phase to the timing of ADC 572.

The output signal from ADC 572, $R_0$, can be input to a digital filter 573. Further filtering and shaping of the signal can occur in digital filter 573. Filter 573 can include, for example, a digital base-line wander filter, a digital automatic gain control circuit, or any other filter. The output signal from digital filter 573, $E_0$, can be input to Next/Echo 250-0, which cancels the interference to channel 301-0 from transmission of data in transmitter 210-$p$ of transceiver 255-$k$ (see FIG. 2B). The output signal from Next/Echo filter 250-0, $Ne_0$, can then be input to cross-channel interference filter 570, which cancels any interference with the base-band signal processed by base-band demodulator 223 from the remaining channels 301-1 through 301-K. The output signal from cross-channel interference filter 570 for channel 301-0, $F_0$, is then input to FEXT filter 251. The output signal from FEXT filter 251, $H_0$, is then input to equalizing filter 574. Filter 574 can include digital filtering and also performs equalization.

Filter 574 equalizes the signal for intersymbol interference. Filter 574 can include a feed-forward section, a feed-back section, or a combination of feed-forward and feed-back sections. The output signal from filter 574 can then be input to data recovery 575. Data recovery 575 recovers the digital signal from the signals received from equalizer filter 574. In some embodiments, data recovery 575 is a PAM slicer. In some embodiments, data recovery 575 can also include an error correction decoder such as a trellis decoder, a Reed-Solomon decoder or other decoder. The output signal from data recovery 575 is then input to descrambler 576 so that the transmitted parallel bits are recovered.

In some embodiments of the invention, the ordering of various filters in the data stream may be altered. For example, NEXT/echo filter 250 may be implemented after cross-channel interference filter 570 and FEXT filter 251 in the data stream. By implementing Next/echo filter 250 first, the size of NEXT/Echo filter 250 may be smaller and/or have less taps. FEXT filter 251 and cross-channel interference filter 570 can move the NEXT/Echo interference from one channel to another, thus it is possible (or even likely) that a transform function $FN_{k_p,k_r}^{t,r}$ which may require few or no taps if cancellation of the NEXT and Echo interference was done first would need more taps after cross-channel interference filter 570 and FEXT filter 251 have been implemented. The opposite phenomena, i.e. implementation of FEXT filter 251 causing the FEXT interference to be transferred between channels, does not occur because NEXT/Echo filter 250 cancel utilizing transmit symbols instead of received signals.

One skilled in the art will recognize that various components of receiver 272-r shown in FIGS. 5A and 5B can be implemented in different orders than are shown. Further, although components are shown as circuit elements in this disclosure, it is understood that some if not all of the functions can be executed utilizing one or more digital processors executing software code.

Figure 6A:
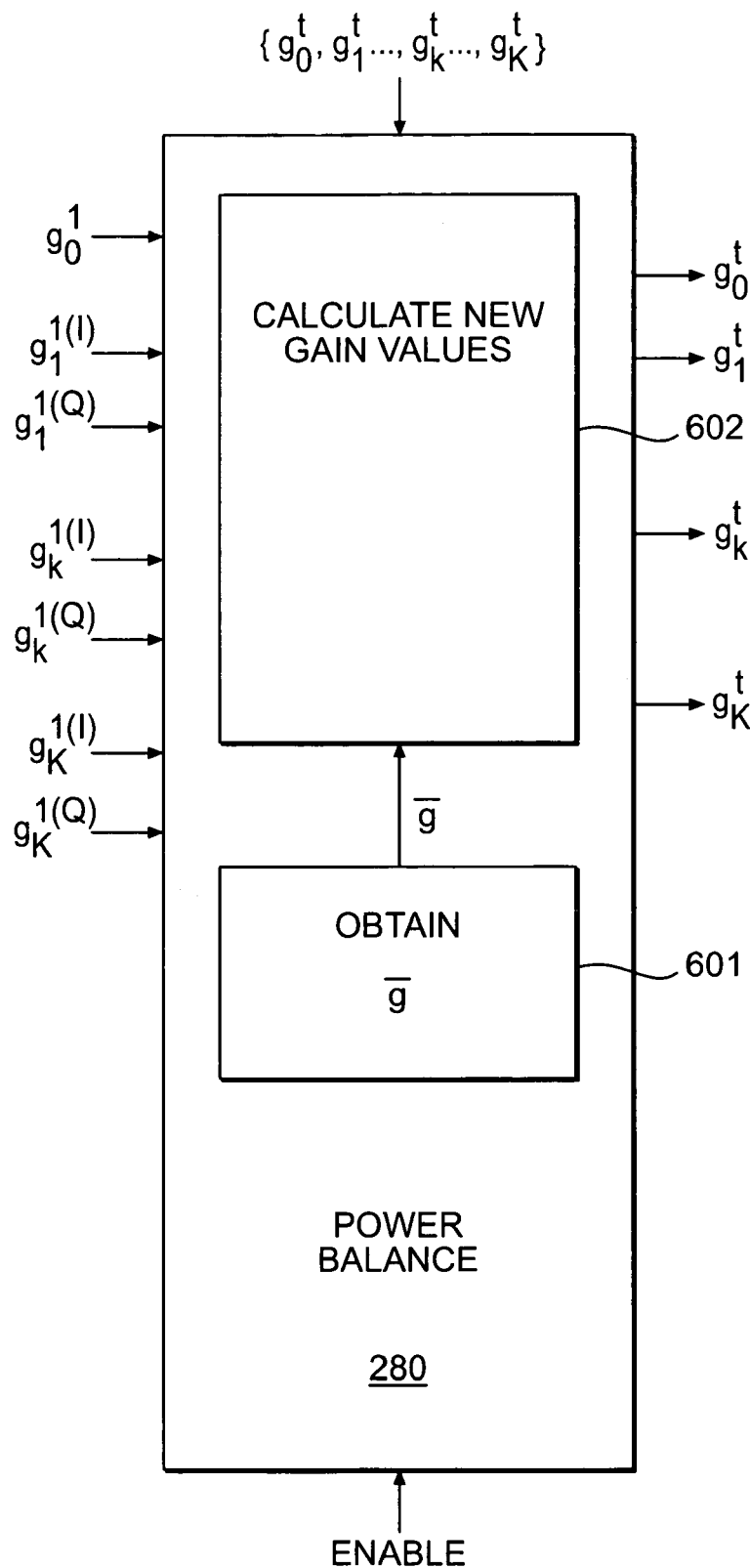
FIG. 6 illustrates a block diagram of a power balance according to an embodiment of the present invention.

FIG. 6A illustrates an embodiment of power balance 280. In the embodiment shown in FIG. 6, the gain values $g_0^1$, $g^{11(I)}$ through $g_K^{1(I)}$, and $g_1^{1(Q)}$ through $g_K^{1(Q)}$ are input to power balance 280. The gain value $g_0^1$ is the output value from AGC 584 from the embodiment of base-band demodulator 223 shown in FIG. 5B. The gain values $g_k^{1(I)}$ and $g_k^{1(Q)}$ are the output values from AGC 520-k of the embodiment of down-converting demodulator 222-k shown in FIG. 5A. Although utilization of the gain values in power balance 280 is illustrated in this disclosure, any parameter or set of parameters that indicates the power received in each channel can be utilized in power balance 280. For example, with reference to FIG. 5A, the parameters $Z_k^I$ and $Z_k^Q$, the output signals from summer 530-k and 531-k, the output signals from filters 504-k and 505-k, $r_k^I$ and $r_k^Q$, and $r_k^I$ and $R_k^Q$ can be utilized in power balance 280 to determine gain values $g_0^t$ through $g_K^t$ for transmitter 270-t.

In the embodiment shown in FIG. 6A, as is illustrated in FIG. 2B, transmitter 270-t,p of transceiver 255-p is in communication with receiver 272-r,q of transceiver 255-q and transmitter 270-t,q of transceiver 255-q is in communication with receiver 272-r,p of transceiver 255-p utilizing the same number of channels with nominally the same center frequencies. Further, transmission medium 110 coupling transmitter 270-t,p with receiver 272-r,q is the same or substantially similar to transmission medium 110 coupling transmitter 270-t,q with receiver 272-r,p. Therefore, transmitter 270-t,p and transmitter 270-t,q are transmitting data into substantially the same or identical environments for receipt by complementary receivers 272-r,q and 272-r,p, respectively. In the embodiment of power balance 280 shown in FIG. 6A, the value $\bar{g}$ is obtained in block 601 and the new transmitter gain values $g_0^t$ through $g_K^t$ are calculated based on the value of $\bar{g}$ in calculation block 602.

In some embodiments, the gain values $g_k^{1(I)}$ and $g_k^{1(Q)}$ are the same value. In other embodiments, the gain values $g_k^{1(I)}$ and $g_k^{1(Q)}$ can be averaged to obtain an average gain value for the kth channel $\bar{g}_k^1$. In some embodiments, a new gain value for each of amplifiers 282-0 through 282-K shown in FIG. 2C for transmitter 270-t,p can be calculated as $$g_k^{t,p}(\text{new}) = g_k^{t,p} \frac{\bar{g}_k^1}{\bar{g}}, \qquad (4)$$

where $\bar{g}$ is the average of all gain values $\bar{g}_k^1$ from receiver 272-r,p. In receiver 272-r,p, the received power is inversely proportional to the receiver gain. Therefore, in accordance with equation (4), if the received power in channel k of receiver 272-r,p is less than the average power received across all of the (K+1) channels, then the gain of channel k in transmitter 270-t is increased. Conversely, if the received power in channel k of receiver 272-r,p is greater than the average power received across all of the (K+1) channels, then the gain of channel k in transmitter 270-t,p is decreased.

In the embodiment of power balance 280 depicted by Equation 4, the power in each of channels 0 through K can becomes substantially the same or very similar. However, in some embodiments the average gain value $\bar{g}$ may be replaced with a set value so that the power received at receiver 272-r,q for each of channels 0 through K can be about a preset value.

In some embodiments, the transmitter gains $g_0^t$ through $g^{Kt}$ can be set at predetermined values and new values of the transmitter gains $g_0^t$ through $g_K^t$ can be calculated if the corresponding receiver gain is greater than a threshold gain $\bar{g}_T$. A new gain value $g_k^t$, for example, can be obtained as $$g_k^t(\text{new}) = g_k^t \sqrt{\frac{\bar{g}_k^1}{\bar{g}_T}} \qquad (5)$$

when the gain $\bar{g}_k^1$ is greater than or equal to 1. In some embodiments, the transmitter gain increase can be limited by a preset limit value. In some embodiments, the gain increase can be set to be specific values based on the ratio $\bar{g}_k^1/\bar{g}_T$. In some embodiments, for example, the gain increase can be set to 0 dB, 1 dB, 2 dB or 3 dB depending on the ratio $\bar{g}_k^1/\bar{g}_T$.

In some embodiments of the invention, only transmitter gains for certain ones of the channels 0 through K are adjusted. For example, in embodiments with only a few channels (e.g., 2 channels), the gains of the higher frequency channels can be adjusted while the gains of the lower frequency channels are not adjusted.

Figure 6B:
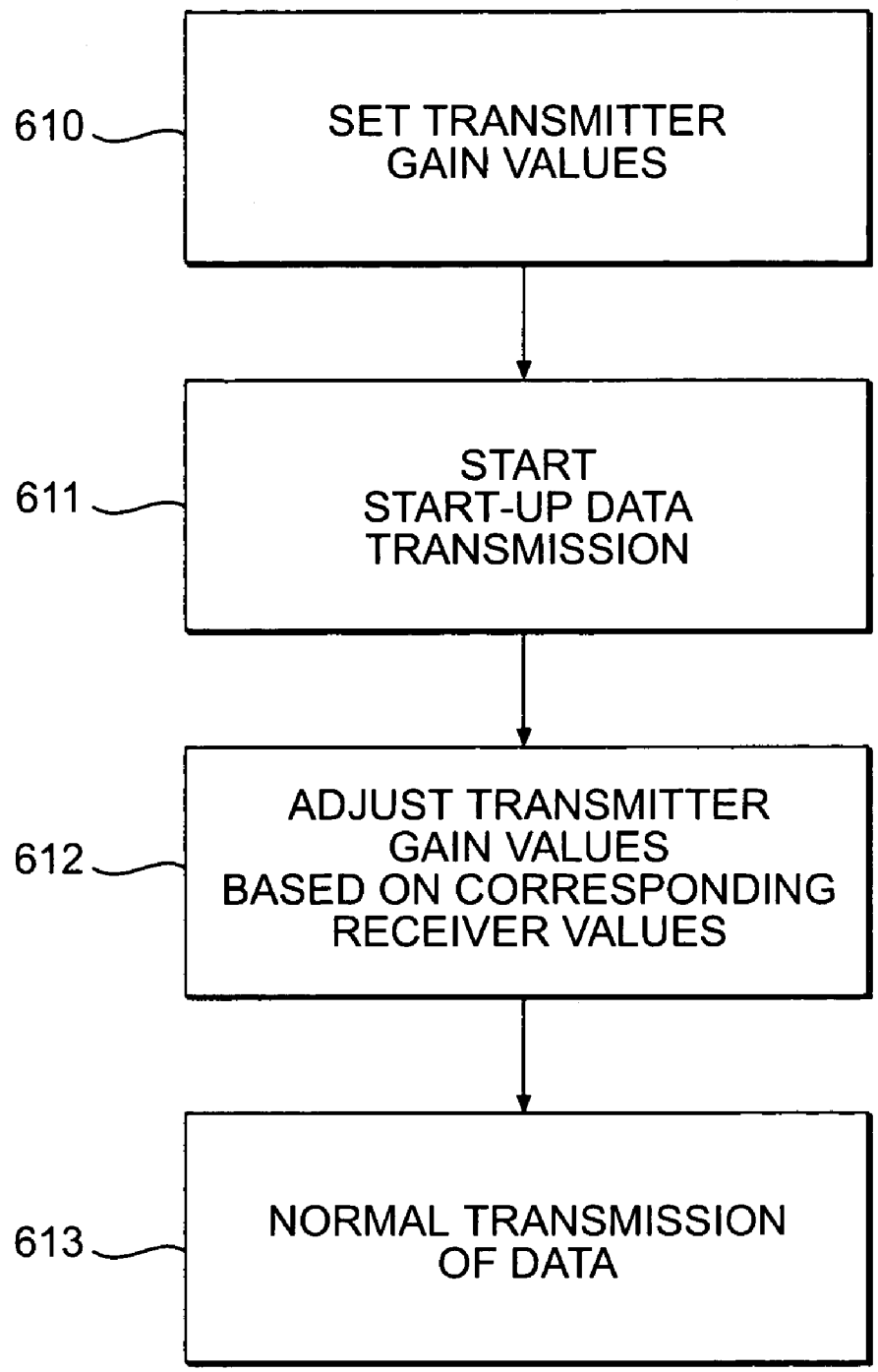

FIG. 6B illustrates a flow chart for a start-up procedure that adjusts the transmit gains of transmitter 270-*t,p* in power balance 280-*p* based on data received at receiver 272-*r,p*. In some embodiments of the invention, power balance 280 is only active during set-up and the gains are fixed throughout the remainder of the time that transmission is active. In some embodiments, the gains can be periodically reset during operation.

In step 610, the transmitter gain values $g_0^t$ through $g_K^t$ of transmitter 270-*t,p* are set at predetermined values. In embodiments where adjusted gains are increased, then gain values $g_0^t$ through $g_K^t$ may be set at nominally low values. In embodiments where gain values are adjusted, then higher initial values of gain values $g_0^t$ through $g_K^t$ may be utilized. Further, if a preselected value for $\bar{g}$ or a threshold value $\bar{g}_T$ is utilized in block 601 of power balance 280, then those values are input to power balance 280 or otherwise obtained by power balance 280, for example by reading the values from a memory.

In step 611, data is transmitted between transmitter 270-*t,q* and 272-*r,p* utilizing the same gain values set for transmitter 270-*t,p* in a corresponding step 610 being simultaneously executed in transceiver 255-*q*. In step 611, data transmitted between transceiver 255-*p* and 255-*q* may be predetermined training data or may be user data being transmitted. In step 612, power balance 280 is enabled and new values for gains $g_0^t$ through $g_K^t$ for transmitter 270-*t,p* are calculated. Some embodiments of such calculations are discussed above. Once new values of gains $g_0^t$ through $g_K^t$ for transmitter 270-*t,p* are determined, those values are utilized throughout transmission of data as is indicated in step 613.

In some embodiments of the invention, new gain values $g_0^t$ through $g_K^t$ for transmitter 270-*t,p* may be calculated in power balancing 280-*q* instead and the new values can then be transmitted by transmitter 270-*t,q* to receiver 272-*r,p*. Although this method may result in better gain values for transmitter 270-*t,q*, it is harder to implement then the method described above of utilizing the data received at receiver 272-*r,p* to adjust the gain parameters of transmitter 270-*t,p*. However, transmitting new gain values from transmitter 270-*t,q* reduces errors made through the assumptions that transmitters 270-*t,p* and 270-*t,q* are identical transmitters and that transmitters 270-*t,p* and 270-*t,q* are transmitting data through identical transmission media 110.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

We claim:

1. A transceiver, comprising:
a receiver that can receive data on a plurality of frequency-separated channels from a transmission medium;
a transmitter that can transmit data on the plurality of frequency separated channels on the transmission medium; and
a power balancer that adjusts the power output on at least one of the plurality of frequency separated channels on the transmitter based on signals received from the receiver, by adjusting at least one gain of at least one amplifier coupled to transmit signals on at least one of the plurality of frequency separated channels wherein the signals received from the receiver are gain values to amplifiers amplifying signals down-converted from each of the plurality of frequency-separated channels, wherein the gain values are determined in response to data received from a complementary transmitter transmitting through the transmission medium, wherein the at least one gain is adjusted by multiplying the at least one gain by a ratio of a corresponding one of the gain values and an average gain value.

2. The transceiver of claim 1, wherein the gain values are determined in an automatic gain circuit.

3. The transceiver of claim 1, wherein the at least one gain is adjusted by multiplying the at least one gain by a ratio of a corresponding one of the gain values and a threshold gain value.

4. The transceiver of claim 3, wherein the at least one gain is adjusted only if the corresponding one of the gain values is greater than the threshold gain value.

5. The transceiver of claim 1, wherein the power balancer is enabled during a start-up process.

* * * * *